(12) United States Patent
Ayatsuka et al.

(10) Patent No.: US 7,188,139 B1
(45) Date of Patent: Mar. 6, 2007

(54) PORTABLE INFORMATION PROCESSING TERMINAL, INFORMATION INPUT/OUTPUT SYSTEM AND INFORMATION INPUT/OUTPUT METHOD

(75) Inventors: Yuji Ayatsuka, Tokyo (JP); Nobuyuki Matsushita, Kanagawa (JP); Junichi Rekimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 735 days.

(21) Appl. No.: 09/713,615

(22) Filed: Nov. 15, 2000

(30) Foreign Application Priority Data

Nov. 18, 1999 (JP) ............................... P11-327670

(51) Int. Cl.
G06F 15/16 (2006.01)
G06F 9/62 (2006.01)

(52) U.S. Cl. ...................... 709/204; 709/203; 709/218; 709/227; 709/228; 709/229; 382/103; 382/159; 382/181

(58) Field of Classification Search ................ 709/200, 709/201–202, 205, 217, 218, 227–229; 700/23–25, 700/83; 395/200.2; 382/103, 154, 159, 382/181; 340/539
See application file for complete search history.

(56) References Cited

U.S. PATENT DOCUMENTS

| | | | | | |
|---|---|---|---|---|---|
| 5,680,480 | A | * | 10/1997 | Beernink et al. | 382/187 |
| 5,715,413 | A | * | 2/1998 | Ishai et al. | 715/825 |
| 5,729,251 | A | * | 3/1998 | Nakashima | 709/250 |
| 5,734,642 | A | * | 3/1998 | Vaishnavi et al. | 370/255 |
| 5,898,434 | A | * | 4/1999 | Small et al. | 715/810 |
| 5,926,116 | A | * | 7/1999 | Kitano et al. | 340/988 |
| 5,971,277 | A | * | 10/1999 | Cragun et al. | 235/462.01 |
| 6,005,861 | A | * | 12/1999 | Humpleman | 370/352 |
| 6,052,456 | A | * | 4/2000 | Huang | 379/201.04 |
| 6,052,512 | A | * | 4/2000 | Peterson et al. | 709/220 |

(Continued)

FOREIGN PATENT DOCUMENTS

EP 984349 A2 * 3/2000

(Continued)

OTHER PUBLICATIONS

Yamazaki, Hiroshi et al. "A Home Video Bus System," IEEE Transactions on Consumer Electronics, vol. 34, Issue 3, Aug. 1988, pp. 728-735.*

(Continued)

*Primary Examiner*—Jason Cardone
*Assistant Examiner*—Melvin H. Pollack
(74) *Attorney, Agent, or Firm*—Bell, Boyd & Lloyd LLP

(57) ABSTRACT

Each device arranged in an information space and a computer are sustainedly connected and the connection can be visually recognized on the display screen of the computer. More specifically, there is provided a feature of "gaze-link" metaphor with which connection between the computer and an object viewed by a camera is established. A visible marker may be applied to the object of connection so that the object may be identified by shooting the object by means of a camera and connection may be established between the computer and the object. As the connection between the identified object and the computer is sustained, the user can specify the target of operation in an intuitive and direct manner without worrying about the ID of each device in a network environment where a large number of devices are mutually connected.

26 Claims, 23 Drawing Sheets

U.S. PATENT DOCUMENTS

| | | | | |
|---|---|---|---|---|
| 6,069,615 | A * | 5/2000 | Abraham et al. | 345/168 |
| 6,112,235 | A * | 8/2000 | Spofford | 709/223 |
| 6,155,840 | A * | 12/2000 | Sallette | 434/323 |
| 6,169,725 | B1 * | 1/2001 | Gibbs et al. | 370/216 |
| 6,185,184 | B1 * | 2/2001 | Mattaway et al. | 370/230 |
| 6,288,716 | B1 * | 9/2001 | Humpleman et al. | 715/733 |
| 6,311,214 | B1 * | 10/2001 | Rhoads | 709/217 |
| 6,317,639 | B1 * | 11/2001 | Hansen | 700/83 |
| 6,340,114 | B1 * | 1/2002 | Correa et al. | 235/462.22 |
| 6,343,313 | B1 * | 1/2002 | Salesky et al. | 709/204 |
| 6,353,848 | B1 * | 3/2002 | Morris | 709/203 |
| 6,363,422 | B1 * | 3/2002 | Hunter et al. | 709/224 |
| 6,374,296 | B1 * | 4/2002 | Lim et al. | 709/225 |
| 6,389,182 | B1 * | 5/2002 | Ihara et al. | 382/309 |
| 6,400,996 | B1 * | 6/2002 | Hoffberg et al. | 700/83 |
| 6,408,331 | B1 * | 6/2002 | Rhoads | 709/217 |
| 6,430,306 | B2 * | 8/2002 | Slocum et al. | 382/118 |
| 6,463,343 | B1 * | 10/2002 | Emens et al. | 700/83 |
| 6,477,579 | B1 * | 11/2002 | Kunkel et al. | 709/229 |
| 6,480,889 | B1 * | 11/2002 | Saito et al. | 709/220 |
| 6,496,835 | B2 * | 12/2002 | Liu et al. | 707/102 |
| 6,501,854 | B1 * | 12/2002 | Konishi et al. | 382/181 |
| 6,522,347 | B1 * | 2/2003 | Tsuji et al. | 345/848 |
| 6,523,064 | B1 * | 2/2003 | Akatsu et al. | 709/226 |
| 6,523,696 | B1 * | 2/2003 | Saito et al. | 709/223 |
| 6,526,449 | B1 * | 2/2003 | Philyaw et al. | 709/238 |
| 6,546,385 | B1 * | 4/2003 | Mao et al. | 700/3 |
| 6,546,419 | B1 * | 4/2003 | Humpleman et al. | 709/223 |
| 6,549,933 | B1 * | 4/2003 | Barrett et al. | 709/203 |
| 6,559,882 | B1 * | 5/2003 | Kerchner | 348/61 |
| 6,570,606 | B1 * | 5/2003 | Sidhu et al. | 348/14.1 |
| 6,571,279 | B1 * | 5/2003 | Herz et al. | 709/217 |
| 6,615,088 | B1 * | 9/2003 | Myer et al. | 700/20 |
| 6,625,812 | B2 * | 9/2003 | Abrams et al. | 725/105 |
| 6,640,145 | B2 * | 10/2003 | Hoffberg et al. | 700/83 |
| 6,653,933 | B2 * | 11/2003 | Raschke et al. | 370/203 |
| 6,661,438 | B1 * | 12/2003 | Shiraishi et al. | 345/835 |
| 6,714,977 | B1 * | 3/2004 | Fowler et al. | 709/224 |
| 6,721,802 | B1 * | 4/2004 | Wright et al. | 709/246 |
| 6,732,915 | B1 * | 5/2004 | Nelson et al. | 235/375 |
| 6,748,122 | B1 * | 6/2004 | Ihara et al. | 382/306 |
| 6,798,349 | B1 * | 9/2004 | Richley et al. | 340/825.36 |
| 6,924,781 | B1 * | 8/2005 | Gelbman | 345/85 |
| 2001/0014176 | A1 * | 8/2001 | Kamada et al. | 382/181 |
| 2001/0014890 | A1 * | 8/2001 | Liu et al. | 707/102 |
| 2001/0021950 | A1 * | 9/2001 | Hawley et al. | 709/225 |
| 2001/0042788 | A1 * | 11/2001 | Ihara et al. | 235/462.11 |
| 2001/0050875 | A1 * | 12/2001 | Kahn et al. | 365/229 |
| 2002/0000468 | A1 * | 1/2002 | Bansal | 235/462.15 |
| 2003/0037341 | A1 * | 2/2003 | Van Der Meulen | 725/143 |
| 2003/0055912 | A1 * | 3/2003 | Martin et al. | 709/218 |
| 2003/0204607 | A1 * | 10/2003 | Kakimoto et al. | 709/229 |
| 2004/0161246 | A1 * | 8/2004 | Matsushita et al. | 398/187 |
| 2005/0162273 | A1 * | 7/2005 | Yoon et al. | 340/539.14 |

FOREIGN PATENT DOCUMENTS

EP 984385 A2 * 3/2000

OTHER PUBLICATIONS

Clement, W. I. "An Instructional Robotics and Machine Vision Laboratory," IEEE Transactions on Education, vol. 37, Issue 1, Feb. 1994, pp. 87-90.*

Luo, Ren C. "Remote Supervisory Control of a Sensor Based Mobile Robot Via Internet," IEEE/RSJ Intl. Conference on Intelligent Robots and Systems, vol. 2, Sep. 1997, pp. 1163-1168.*

* cited by examiner

PORTABLE INFORMATION PROCESSING TERMINAL, INFORMATION INPUT/OUTPUT SYSTEM AND INFORMATION INPUT/OUTPUT METHOD

BACKGROUND OF THE INVENTION

1. Field of the Invention

This invention relates to a proposal for a user interface environment in terms of operations of issuing commands to a computer and, more particularly, it relates to a proposal for a user interface environment that allows the user to issue commands in an intuitive and easily understandable manner to a computer.

Still more particularly, the present invention relates to a proposal for a user interface environment that allows the user to operate various devices in an information space in an integrated, intuitive and easily understandable manner on user's computer. In such a user interface environment, the user can operates various devices in an information space in an intuitive and easily understandable manner on a computer display.

2. Related Background Art

As a result of technological innovations in recent years workstations and personal computers, which are compact general purpose computer systems with high added values and enhanced functional features have been developed and marketed at low prices. Such computer systems are almost ubiquitous in various research institutions including colleges and universities, commercial firms and offices and ordinary homes where people spend their daily lives.

One of the recent trends in the field of computer technology is down-sizing of computers. Particularly, compact and lightweight portable computers (mobile computers) have become very popular owing to the recent development of semiconductor technology that has made very small LSI (large scale integration) chips commercially available and boosted the processing capacity of computer processors.

Portable computers include so-called "notebook PCs" and palm-top sized computers, which are also referred to as "PDA (personal digital assistants)". These and other computers can be operated with systems in an mobile environment so that the user can use his or her own computer almost anywhere, indoors, outdoors, in moving vehicles, etc.

Most computer systems provide the user with an interactive processing environment so that the computer system operates in response to the command issued to it by the user and the outcome of the processing operation is displayed on the display screen of the system. Currently, there is occurring a shift from the character-based user input environment or "the CUI (character user interface) environment" such as DOS (disk operating system) shell screen to the graphic-based user input environment or "the GUI (graphic user interface) environment". In the GUI environment, a disk top unit simulating a computer system and numerous icons are provided for the display screen.

In the case of a disk top type computer provided with a GUI, all resource objects to be handled in the computer system including files are expressed by icons. The user can intuitively issue commands by directly operating icons on the display screen that represent respectively programs, data, holders and devices by means of a mouse and other I/O devices (with motions such as click, drag and drop, etc.). Therefore, the user is no longer required to memorize specific commands and learn how to handle them. Nor he or she is required to learn how to operate the keys of the keyboard for issuing commands, which is normally a very cumbersome task.

Another of the recent trends in the field of computer technology is interconnection. Computers may be interconnected typically by way of local interfaces such as serial ports and parallel ports or by way of network interface cards (NICs) so that they may be connected to each other by way of one or more than one telecommunication networks. From the viewpoint of interconnection of computers, telecommunication networks include LANs (local area networks) provided on single sites, WANs (wide area networks) realized by connecting LANs by way of dedicated lines and the internet which is a global telecommunication network realized by connecting various networks.

Interconnection of computers provides advantages including that information and computer resources are shared by a number of computer users, that information is delivered and disseminated highly efficiently and that a plurality of computers can be driven in a cooperative and concerted manner to carry out a common mission. For instance, an operation of processing a digital object can be carried out highly efficiently when a plurality of computers are made to cooperate in an intensive way.

Particularly, in recent years, the user can link his or her computer easily to a telecommunication network as a result of the advent of proximity telecommunication systems such as wireless LAN that is a wireless version of Ethernet and blue tooth[1]. The computers and peripheral devices (e.g., printers) installed in a building can mostly be connected to a telecommunication network so that they may be shared for operation by a plurality of users. Additionally, computer users can carry their own computers to any place they want and link them to a telecommunication network without difficulty.

In a distributed computing environment, the computers connected to a network are in a "transparent" state and they can be operated by means of an application program regardless if it is stored in a local storage disk or in a remote disk. In other words, the user is no long required to know the locations of resource objects such as programs and data because they can be exchanged seamlessly among computers.

The user can link his or her computer to a telecommunication network without any difficulty. However, if the user wants to specify a particular computer or peripheral device (target) to which data are to be transferred by way of the network, he or she has to know its ID (or its address) if it is located just in front of the user. In other words, even in a transparent and distributed computing environment, user operations are rather indirect and the related computers are not cooperative so that the user cannot act intuitively.

For example, if the user want to transfer an object between two or more than two computers in a currently available GUI environment, he or she is required to display a list of the devices linked to the network on an explorer screen and find out the icons simulating the respective computers before proceeding to a "drag and drop" operation.

A technique for solving the user operation problem may be the use of a real world-oriented user interface, which represents the technology for expanding the scope of the user operation from the "digital space" produced on a display screen of a computer to the space of the real world in an discontinued way. With such a real world-oriented interface, the display screen of the computer may be expanded to the surface of the disk on which the computer is placed and also to the surface of the walls of the room where the computer is located. In other words, the information space of the user expands beyond the limit of the digital space of the stand-alone computer to the entire room so that digital objects of the digital space of the computer and physical objects of the real world can be handled in an integrated manner.

For instance, "pick-and-drop[2]" is an expansion of user operation "drag- and drop" that is reliably being utilized in the GUI environment and represents the technology of advanced interactions for mapping the transfer of objects such as data among a plurality of computers into an intuitive motion in the real world.

With the "pick-and-drop" technique, seamless "pick-and-drop" operations can be realized as a result of cooperation of a plurality of disk top computers. For example, when an object is dragged by operating the user input device that may be a track ball or a stick of a disk top computer to move the pointer in the display screen beyond an edge thereof, the drag operation may be succeeded to the display screen of the adjacently located disk top computer so that the pointer of the latter display screen appears, dragging the object.

On the other hand, the pointer in the display screen of the former disk top computer disappears, while dragging the object. This operation of the pointer of the former disk top computer picking up an object is referred to as "pick" while the operation of causing the pointer of the latter disk top computer to appear in order to continuously drag the object is referred to as "drop". Thus, the entity of the object (e.g., a data file) is transferred behind the screen between the two computers by way of the network. In other words, the succeeded drag operation accompanies a movement of the entity of the object. FIG. 1 schematically illustrate an "pick-and-drop" operation of an digital object of adjacently located computers.

As for "pick-and-drop" operations, refer to Japanese Patent Application Laid-Open Publication No. 11-53236 whose assignee is the applicant of the present patent application, specifically passages [0052] through [0059] and FIGS. 6 through 9 of the above patent document.

On the other hand, with "media blocks[3]", the user can assign data such as images to blocks having respective IDs and move the data by carrying the corresponding blocks or rearrange the data by physically rearranging the latter. Therefore, blocks may be arranged in a dedicated slot or on a dedicated rail of a computer and data may be moved or rearranged by transferring corresponding blocks in the computer.

"Hyper-drag[4]" provides a user interface environment for the portable user computer to cooperate with a shared computer designed to use a desk top or a wall as display screen. For example, "hyper-drag" operations can be supported by introducing a camera-based object recognition system into the information environment. More specifically, the image of a computer display screen may be projected onto the surface of a disk top or a wall by means of a projector. Furthermore, both a projected image that is an object in the logical space of the computer and an object of the real world (that may be found on a disk top) may be recognized on the basis of a corresponding image picked-up by a camera and the motions of the objects may be traced so that the user can operate the computer interactively on the display screen that is now expanded to the disk top or the wall.

With "hyper-drag", the digital space of a computer is expanded into the space of the real world. For example, a drag operation conducted on a user computer is made to continue on the plane where the computer is placed (e.g., the surface of a disk) (see FIG. 2) and the plane or the space containing it may be expanded to an wall of the workshop (see FIG. 3). In other words, the space of the workshop where the computer is placed can be used as if it were a the disk top input device of the computer to operate for the object.

As for "hyper-drag" operations, refer to Japanese Patent Application No. 11-316461, the assignee of which is the applicant of the present patent application The above described known techniques make it possible to expand the digital space of a computer into the space of the real world so that operations for handling objects can be carried out easily and intuitively by making a plurality of computers cooperate.

However, the above known techniques are adapted to transfer data only once or only a block of data and necessary connections are established only through user operations. Nor any sustained connections are assumed for those techniques. In other words, the user is required to handle objects in a digital space or in the real space for each transfer of data and, once the object handling or the data transfer is over, the computer is disconnected from the related devices.

However, the user may retain interest in any of the devices after transmitting data and/or one or more than one commands to an external device. For example, he or she may want to monitor the operation of a device after issuing a command to it or add a command or operation for handling the device. Then, since the connections of the device are sequentially cut, the user is required to operates the computer almost incessantly in order to allow the it to continuously communicate with the device. In other words, it is not possible to keep the connection in a standby state until the device is brought into a predetermined certain state.

For example, while it is possible to specify an object of connection typically by using the technique of "pick-and-drop", neither the computer nor the object is provided with means for showing the state of "being connected" or what it is connected to so that the object of connection should be referred to only by using its name except the moment when it is connected to the computer. In other words, it is necessary that the state of connection is visible to the user in order to establish a sustained connection by means of a physical operation like "pick-and-drop".

With "pick-and-drop", the stylus of a digitizer is used for picking up a displayed object from a display screen and drop it in another display screen. The technique of "pick-and-drop" resembles an operation of picking up a physical object and drop it. The stylus cannot be operated to handle an object that is out of the reach of the user. In other words, a remote information device cannot be picked up and dropped by remote control.

With the technique of "hyper-drag", on the other hand, it is possible to expand an information space from the digital space of a computer to an operational space of the real world to realize a spatial continuity for the handling of information. As a result, a digital object and a physical object can be handled in a cooperative manner. More specifically, a digital object can be dragged and dropped onto a physical object to establish a new link between the physical object and the digital object and a digital object can be attached to a physical object and moved in the real space. Furthermore, a digital object can be drawn out of a physical object.

However, while an informational environment can be made to three-dimensionally continue in the real world with the technique of "hyper-drag", the technique is not adapted to handle a physical object on a computer display screen digitally or by means of a command. For example, while a digital object may be attached or transferred to a physical object such as a video player, the recording or replay operation of the video player is not something that can be handled by a command issued by way of a computer.

In addition to the studies as cited above, a number of other studies have been reported in the field of real world-oriented interface. For example, there are known studies on objects and places that are provided with a physical (and hence visible) identifier so that information may be displayed or transferred by means of computer resources. Systems as proposed by Chameleon[5], NaviCam[6], CyberGuide[7], UbiquitousLinks[8] and document[9] may be regarded as interfaces through which a block of data can be taken out from an object or a place.

Chameleon is a system for displaying information by means of a magnetic sensor depending on the position and the posture of a hand-held display and commands can be input by moving the display with the system.

NaviCam is a system adapted to use an ID that can be identified by image recognition to provide information according to the identified ID. Navicom can be combined with gyros and voice recognition.

CyberGuide is a system adapted to display guide information on a PDA according to the position of the user by means of an ID using ultraviolet rays. The data to be displayed is stored in the PDA in advance.

UbiquistousLinks is a system adapted to establish a link from an object or a place to a resource object on a WWW (world wide web) by using an ID tag or an ultraviolet ray ID. With such a system, data can be transferred and the linked destination can be shifted sequentially in the order of the identified Ids.

The document [9] proposes a system resembling UbiquitousLinks that can establish a link from an object to an electronic information source such as WWW by attaching a tag to the object.

Additionally, the systems proposed by "Infospuit" [10], "Extended Disk Top Environment [11] and document [12] are adapted to transfer or assign data to an object in addition to drawing out data from an object. They are also adapted to bidirectional data transfer.

Infospuit is a system where an object in the real world and a computer can exchange information by way of a device that can recognize two-dimensional codes such as a remote control unit. It is also provided with a feature of switching its operation depending on the destination of data transfer.

Extended Disk Top Environment is a system adapted to virtually arrange icons in space by recognizing the images picked up by a camera. With the system, any printer in the picked up image can be registered in advance and a printing operation can be carried out by dropping the icon.

Document [12] proposes a system adapted to recognize a place or an object by means of a two-dimensional matrix or an infrared ray ID and see a picture or a memo showing voiced information and paste it to the place or the object.

However, none of the above described real world-oriented interfaces assume sustained connections.

Meanwhile, the network environment for interconnecting computers have been remarkably improved in recent years and nowadays users are not required to pay particular efforts for connecting computers to a telecommunication network (previously described). Furthermore, many devices designed for use in ordinary daily lives are currently provided with information processing means to make themselves compatible with a telecommunication network. For example, video recorders, television sets, refrigerators and electric kettles are information-oriented and can be remotely controlled by means of computer and a network.

However, when the user tries to specify a particular electric home appliance on the network, he or she is required to know its ID (or its address) and how to issue a command to it. In other words, the operation of issuing a command by way of a network is an indirect one and cannot be conducted in an intuitive way.

Electric home appliances are provided with excellent user interfaces such as a control panel/button and ordinary users who do not know how to operate computers can issue commands to them and use them almost without learning anything about electronic control systems. However, remote control systems involving networks are not as convenient as those of electric home appliances.

BRIEF SUMMARY OF THE INVENTION

In view of the above circumstances, it is therefore an object of the present invention to provide a comfortable user interface environment where users can issue commands to computers in an easy and intuitive way.

Another object of the present invention is to provide a comfortable user interface environment where users can operate various devices arranged in an information space in an easy, intuitive and integrated way by means of the user computer.

Still another object of the present invention is to provide a comfortable user interface environment where users can control and operate various devices arranged in an information space in an easy and intuitive way on the user computer display.

Still another object of the present invention is to provide a comfortable user interface environment where users can sustainedly connect various devices arranged in an information space to computers.

A further object of the present invention is to provide a comfortable user interface environment where users can sustainedly connect various devices arranged in an information space to computers and confirm the connected state on the user computer display.

A still further object of the present invention is to provide a comfortable user interface environment where users can sustainedly connect various devices arranged in an information space to computers and cause them to exchange commands and data.

In the first aspect of the present invention, the above objects and other objects are achieved by providing a portable information processing terminal adapted to be connected to one or more than one targets by way of a network, said terminal comprising:

an imaging means for imaging visible identification information possessed by the targets:

an identification means for identifying the targets on the basis of the identification information imaged by said imaging means; and a connection means for establishing connection between itself and the targets identified by said identification means.

The portable information processing terminal in the first aspect of the invention may further comprise an image confirmation means for confirming the images of the targets including said identification information.

In the second aspect of the present invention, there is provided an information input/output system comprising:

a user terminal to be used by a user;

one or more than one targets connected to said user terminal in a format adapted to transfer of information and including visible identification information;

an imaging means for imaging visible identification information;

an identification means for an identifying the targets on the basis of the identification information imaged by said imaging means; and a connection means for establishing connection between the user terminal and the targets identified by said identification means.

The information input/output system in the second aspect of the invention may further comprise an image confirmation means for confirming the images of the targets including said identification information.

In the information input/output system in the second aspect of the invention, said imaging means may be provided integrally in said user terminal or connected to said user terminal by way of a cable or a network.

In the information input/output system in the second aspect of the invention, it may be so arranged that said user terminal is connected to said targets by way of a network; and said targets have respective network addresses;

said information input/output system further comprising a data base means for controlling the correspondence between the identification information of each target and its network address. With this arrangement, said connection means can connect the user terminal and the targets by referring to said data base means for the network address of each target that corresponds to the identification information.

In the information input/output system in the second aspect of the invention, said connection means may sustain the connection between the targets and said user terminal as long as the imaging means is imaging the targets or their identification information.

Said user terminal may include a display screen; and the images taken by said imaging means may be displayed on said display screen. With this arrangement, said connection means may sustain the connection between the targets and said user terminal as long as the targets identified by said identification means are displayed on said display screen. Alternatively, said images of the targets taken by said imaging means may be held on said display screen as long as said connection means sustains the connection between the targets and said user terminal.

Said user terminal may have a storage means for storing the taken images of said targets identified by said identification means. With this arrangement, said connection means may establish connection between said user terminal and relevant taken targets in response to the display of said image on said display screen. Alternatively, it may be so arranged that all the taken images retrieved from said storage means are displayed on the display screen and the connection means establishes connection between said user terminal and relevant taken targets in response to the selection of said image from said displayed images.

The information input/output system in the second aspect of the invention may further comprise an application means for transferring predetermined data and/or commands between the user terminal and the targets being connected.

Said application means can transfer the page being displayed on the display screen to a projector, or a target, as an image to be projected as long as said connection means sustains the connection between the projector and the user terminal.

If the user terminal comprises a keyboard or some other user input means, said application means can transfer the user input data input by using said user input means as user input data on a computer system, or a target, as long as said connection means sustains the connection between the computer system and the user terminal.

Said application means can obtain the data to be shown from targets and display them on the display screen as long as said connection means sustains the connection between said targets including said data to be shown and updated regularly or irregularly and the user terminal.

Said application means can receive alarms from a target and execute said alarm on said user terminal as long as said connection means sustains the connection between a device having an alarm feature, or a target, and the user terminal.

Said application means can transmit the video recording appointment information input at said user terminal to a video recording/reproduction apparatus having a video recording appointment feature, or a target, so long as said connection means sustains the connection between said video recording/reproduction apparatus and the user terminal.

Said application means can display an image of operation for controlling remotely controllable targets on the display screen and transmit the user operation displayed on the display screen to the targets as long as said connection means sustain the connection between the target and the user terminal.

In the third aspect of the invention, there is provided an information input/output method for processing user inputs/outputs in an information space comprising a user terminal to be used by a user;

one or more than one targets connected to said user terminal in a format adapted to transfer of information and including visible identification information, an identification means for identifying the targets on the basis of the identification information imaged by said imaging means and a connection means for establishing connection between the user terminal and the targets identified by said identification means; said method comprising:

(a) step of identifying the targets on the basis of the identification information imaged by said imaging means; and (b) a step of establishing connection between the targets identified by said identification means and said user terminal.

With the above arrangement, it is possible to connect said user terminal and said targets to a network and assign specific network addresses to the respective targets. A data base means for controlling the correspondence between the identification information of each target and its network address may be provided in said information space. If such is the case, the user terminal and the targets can be connected by referring to said data base means for the network address of each target that corresponds to the identification information in said step (b) of establishing the connection.

Said information space may be further provided with an image confirmation means for confirming the images of the targets including said identification information.

It may be so arranged that the connection between the targets and said user terminal is sustained as long as the imaging means is imaging the targets or their identification information in said step (b) of establishing the connection.

It may also be so arranged that the connection between the targets and said user terminal is sustained as long as the targets identified by said identification means are displayed on a display screen in said step (b) of establishing the connection. Alternatively, it may be so arranged that the said images of the targets are be held on a display screen as long as said connection means sustains the connection between the targets and said user terminal.

Said user terminal may have a storage means for storing the taken images of said targets identified by said identification means. With this arrangement, said step (b) is executed to establish connection established between said user terminal and relevant taken targets in response to the display of said image on said display screen.

It may be so arranged that said method further comprises (c) a step of displaying all the taken images retrieved from said storage means on the display screen; and said step (b) is executed to establish connection between said user terminal and relevant taken targets in response to the selection of said image from said displayed images.

It may be so arranged that said method further comprises (d) an application step of transferring predetermined data and/or commands between the user terminal and the targets being connected.

Then, the page being displayed on the display screen to a projector, or a target, may be transferred as an image to be projected as long as the connection between the projector and the user terminal is sustained in said application step (d).

The user input data input by using said user input means can be transferred as user input data on a computer system, or a target, as long as the connection between the computer system and the user terminal is sustained in said application step (d).

Data to be shown can be obtained from the target and displayed on the display screen as long as the connection between said targets including said data to be shown and updated regularly or irregularly and the user terminal is sustained in application step (d).

Alarms can be received from a target and executed on said user terminal as long as the connection between a device having an alarm feature, or a target, and the user terminal is sustained in said application step (d).

The video recording appointment information input at said user terminal to a video recording/reproduction apparatus having a video recording appointment feature, or a target, can be transmitted to the target so long as the connection between said video recording/reproduction apparatus and the user terminal is sustained in said application step (d).

An image of operation for controlling remotely controllable targets can be displayed on the display screen and the user operation displayed on the display screen can be transmitted to the targets as long as said the connection between the target and the user terminal is sustained in said application step (d).

The present invention provides a real world-oriented user interface that can sustainedly connect a computer and other information devices in the real space, which may be a predetermined space for work. The expression "sustained connection" as used herein implies the following characteristic aspects.

(1) Data can be transferred bi-directionally.

(2) Data will not necessarily be transferred (nor need to be transferred) at the moment of an operation (when connection is established between devices).

(3) Devices can be operated interactively so that the transferred data can be controlled at the terminal that transmitted the data.

Such sustained connection is useful particularly when, for example, the user uses the note book PC he or she brings into a work space in place of the keyboard of the computer installed in the work space and the key arrangement of the installed computer differs from that of the PC the user brings in. Another example may be that the user uses a device having a console panel for limited resources such as printer as console for maintenance operations. Still another example may be that the user transfers transparency data from the computer he or she has at hand to a plurality of projectors arranged for presentation in an event and/or controls transparency switching operations by means of the computer.

Known interfaces for displaying information and transferring data may be classified into (a) those adapted to identify an object by means of a sensor for detecting infrared rays, electric waves or magnetic waves that is held in contact or close to the object and (b) those adapted to identify an object by way of visible identification information imaged by a camera.

In the case of interfaces of the type (a), it is highly difficult to sustain the connection between the computer and some other object unless the sensor is held in contact with the object in view of the fact that a data transfer can occur the instant when the connection is established.

On the other hand, in the case of interfaces of the type (b), the connection between the computer and some other object can be sustained by keeping an image of the object picked up when the connection is established typically as still image. Additionally, an object that was connected in the past can be selected by retrieving and viewing the image picked up when the connection was established just like the image of a new object.

The present invention provides a real world-oriented interface that is adapted to establish connection between an object that a computer (e.g., notebook PC) is (or was) viewing by way of a camera. This interface has a metaphoric feature that "it connects what it sees", which the inventors of the present invention refers to as "gaze-link" metaphor.

FIG. 4 of the accompanying drawings schematically illustrates an operation of the feature of "gaze-link" metaphor. Referring to FIG. 4, as the camera that a portable computer is equipped with as one of the standard accessories views the control panel of a video recording/reproduction apparatus arranged at the front surface thereof, the camera picks up an image of the control panel, which image is then displayed on the display screen of the computer to establish connection between the computer and the video recording/reproduction apparatus. The established connection is sustained as long as the image of the control panel is displayed on the display screen.

In such a state of connection, data can be transferred bidirectionally and various operations can be conducted in an interactive way. The video recording/reproduction apparatus is identified by the computer and it is possible to call the functions of the control panel on the computer display screen. More specifically, operation buttons such as "record", "replay", "stop", "suspend", "fast forward winding" and "fast backward winding" are displayed on the display screen and the user can operate the video recording/reproduction apparatus by using the buttons displayed on the display screen just like he or she uses the proper buttons on the control panel. More over, the user can operate the video recording/reproduction apparatus remotely simply by using any of the buttons on the control panel. The feature of "gaze-link" metaphor may be taken for as an expansion of the metaphoric feature of "retrieving information on what is viewed". The metaphoric feature of "retrieving information on what is viewed" is referred to as "magnifying glass metaphor" in document [13]. The "magnifying glass metaphor can only retrieve fixed information from the object "being viewed". To the contrary, the feature of "gaze-link" metaphor of the present invention can transfer data bidirectionally.

Taking apart that the "gaze-link" metaphor provides bidirectional data transfer and that data can be transferred in a non-fixed way, it can be regarded as a feature of repeatedly transferring stand-along small data. On the other hand, document [4] proposes a system that can bidirectionally transfer non-fixed information previously described. However, the system described in the above document is designed to transfer a stand-along block of data and not adapted to exchange small data for a number of times.

The man's action of "view" has a strong affinity for the concept of connection. For instance, in a party where a large number of people enjoying conversation, any two who are talking to each other will be looking at the partners as a matter of course. Similarly, if you are talking to a person at a remote terminal, you can talk more vividly when you can see the partner than when you can just hear what the partner is talking so you will probably prefer to see him or her.

The concept of "seeing" can be expanded from the real world where you can see a physical object. For example, if a still image of a viewed object is recorded (and stored in the local storage disk of a computer) as described above and then you are moved away from the place where you can see the object, you can nevertheless establish connection between the object and your terminal by selecting the still image (or taking it out from the local storage disk) so that you can "see" the object.

It is also possible to provide a metaphoric feature that what is "viewed" is a recorded video image and the object of the image can be connected by seeing it. Referring to FIG. 5 of the accompanying drawings schematically illustrating a scene of teleconference, the display screen of the remote site may be connected and shot by a camera by means of the same metaphoric feature. It is also possible to establish connection between the main conference room and the remote site to see a stored still image. The feature of "gaze-link" metaphor of the present invention can find applications that are based on the concept of "connection". Fur example, it is possible to switch the telephone call to the user location, or the computer of the user location, simply by "viewing" the telephone set (or leaving an image of the telephone set on the computer display screen).

For instance, a system for switching a telephone call to the telephone set at the location of the called by using "Active-Badge"[14] has been developed. However, with the feature of "gaze-link" metaphor of the present invention, the destination of transfer of telephone calls can be changed temporarily in a very simple way. Also the user can be notified of the reception of a fax letter when the fax machine is "viewed". Similarly, the user can be notified of an event such as "water has boiled" or "water has run out" when the electric kettle is "viewed" (assuming that the electric kettle can be monitored by way of a telecommunication network. Refer to "Potbiff" that will be described hereinafter).

Interactions are allowed as long as connection is sustained. Therefore, it will be possible to realized "multipurpose remote control" adapted to control objects simply by viewing them. Applications for controlling various devices that are being "viewed" may also be developed by using the technique of more direct operations of GUI (graphical user interface) on video images.

Therefore, according to the present invention, it is possible to provide a comfortable user interface environment where users can operate various devices arranged in an information space in an easy, intuitive and integrated way by means of the user computer.

According to the present invention, it is also possible to provide a comfortable user interface environment where users can control and operate various devices arranged in an information space in an easy and intuitive way on the user computer display.

According to the invention, it is also possible to provide a comfortable user interface environment where users can sustainedly connect various devices arranged in an information space to computers.

According to the invention, it is also possible to provide a comfortable user interface environment where user can control or operate various devices in an information space in an easy and intuitive way on the user computer display.

According to the invention, it is also possible to provide a comfortable user interface environment where users can sustainedly connect various devices arranged in an information space to computers and confirm the connected state on the user computer display.

According to the invention, it is also possible to provide a comfortable user interface environment where users can sustainedly connect various devices arranged in an information space to computers and cause them to exchange commands and data.

According to the invention, there is provided a feature referred to as "gaze-link" metaphor that can be used to establish connection between a portable computer equipped with a camera and an object that is viewed by the camera. For example, if ID codes such as "cyber codes" (previously described) are assigned and applied to the respective objects to be connected to the portable computer, the computer will recognize any of the objects on the basis of the image thereof shot by the camera and establish connection between itself and the selected object.

According to the invention, it is now possible to introduce the concept of sustained "connection" as opposed the conventional techniques of sequential transfer of data, using known real world-oriented interfaces. As a result, the user can intuitively and directly specify an object to be operated by using the feature of "gaze-link" in a telecommunication network environment where a number of devices are mutually connected in an office or home without being worried about the IDs and the network addresses of the devices. In other words, users are relieved of the cumbersome work of assigning names to the devices and memorizing them.

Furthermore, it is not necessary to "view" an object directly. In stead, a remote object may be viewed by way of a video image or a photograph image to operate real world-oriented interfaces. Furthermore, images taken by the camera may be stored in the computer so that an image that has been "viewed" to connect the object of the image may be selected from the storage and reused for connection. Additionally, since images of objects are used in place of the objects themselves, an object can be connected to a remote terminal by way of an image taken by a video camera in a teleconferencing environment.

The above objects and other objects of the present invention as well as the advantages of the invention will become clear by reading the following description of the preferred embodiments of the invention made by referring to the accompanying drawings.

DETAILED DESCRIPTION OF THE INVENTION

Now, the present invention will be described in greater detail by referring to the accompanying drawings that illustrate preferred embodiments of the invention.

Figure 1:
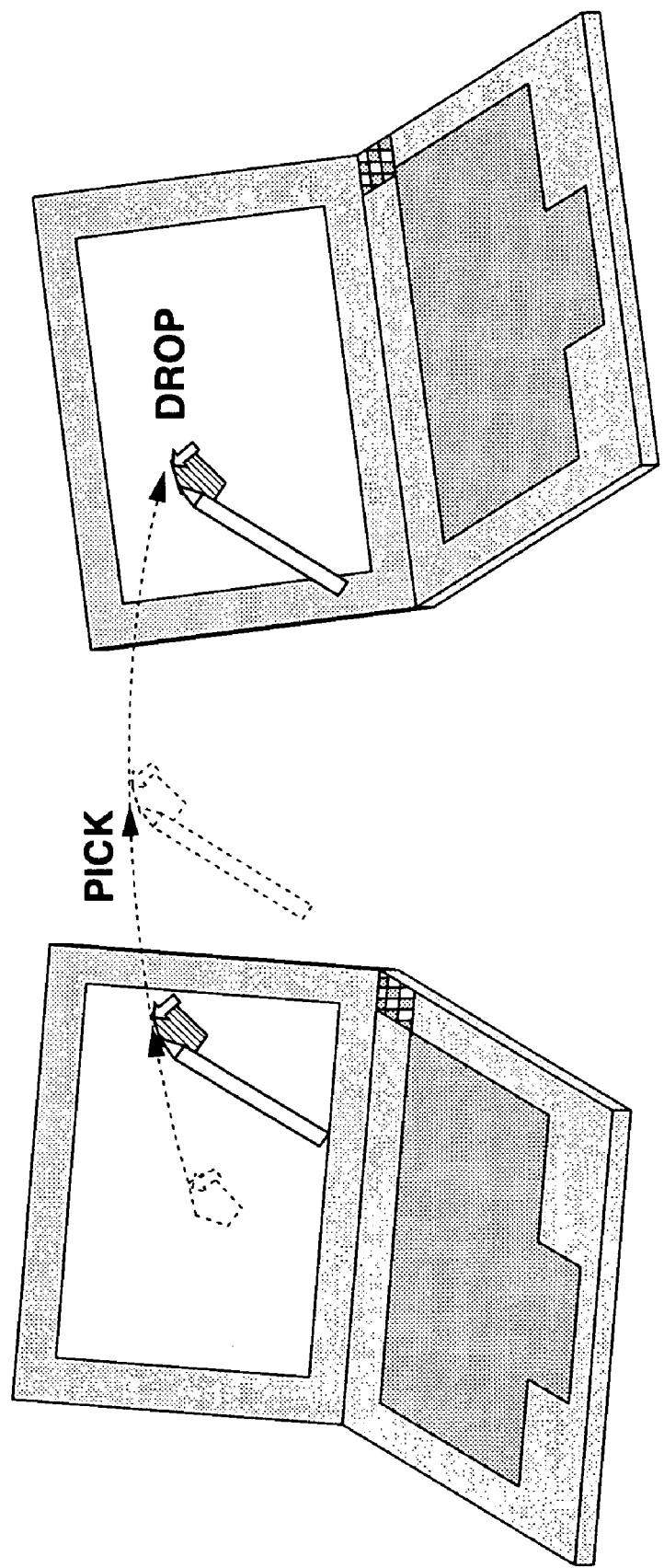
FIG. 1 is a schematic illustration of a Pick-and-Drop operation and, more specifically, it shows how a GUI operation is succeeded from the display screen of a notebook type computer to that of another computer and a digital object on the former display screen is dropped on the other display screen that are separated from each other in the real space.
Figure 2:
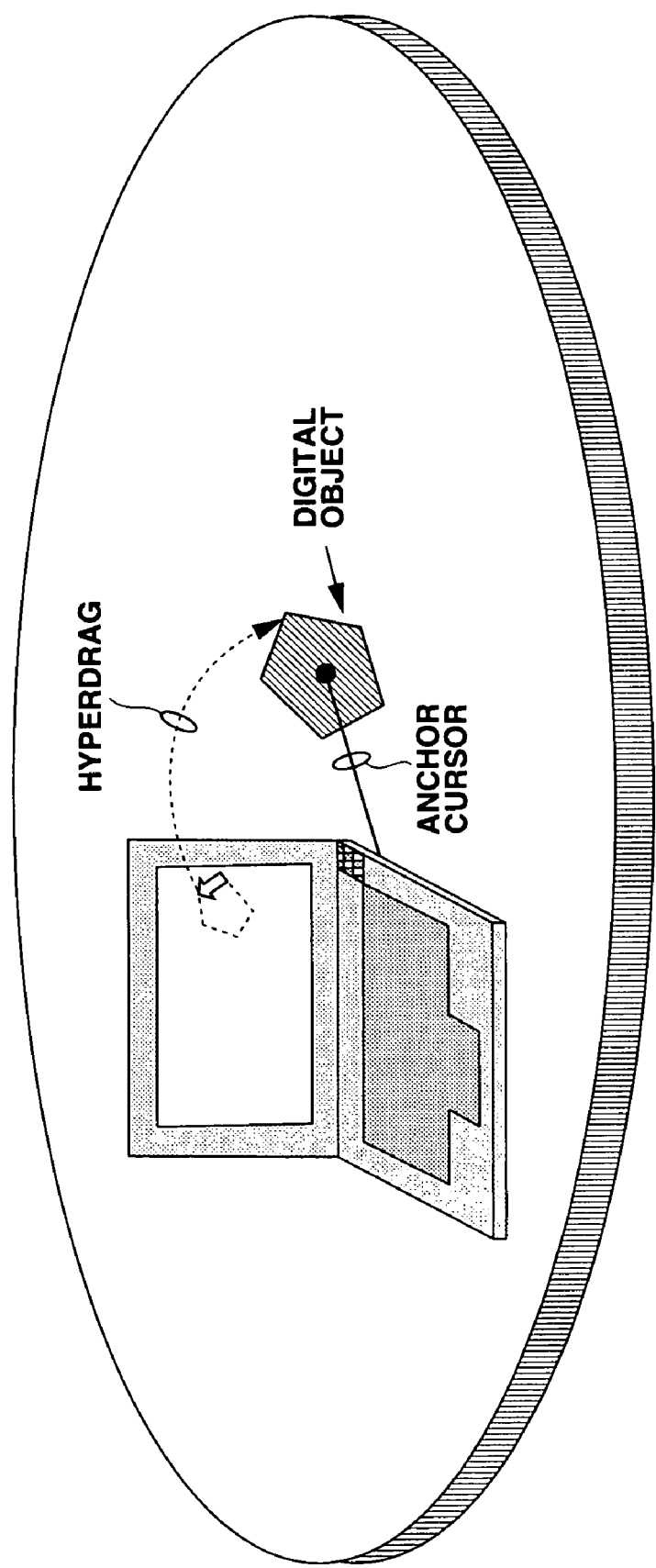
FIG. 2 is a schematic illustration of a Hyperdrag operation and, more specifically, it shows how the cursor getting to an edge of the display screen of a computer as a result of the operation of the mouse is moved onto the table carrying the computer.
Figure 3:
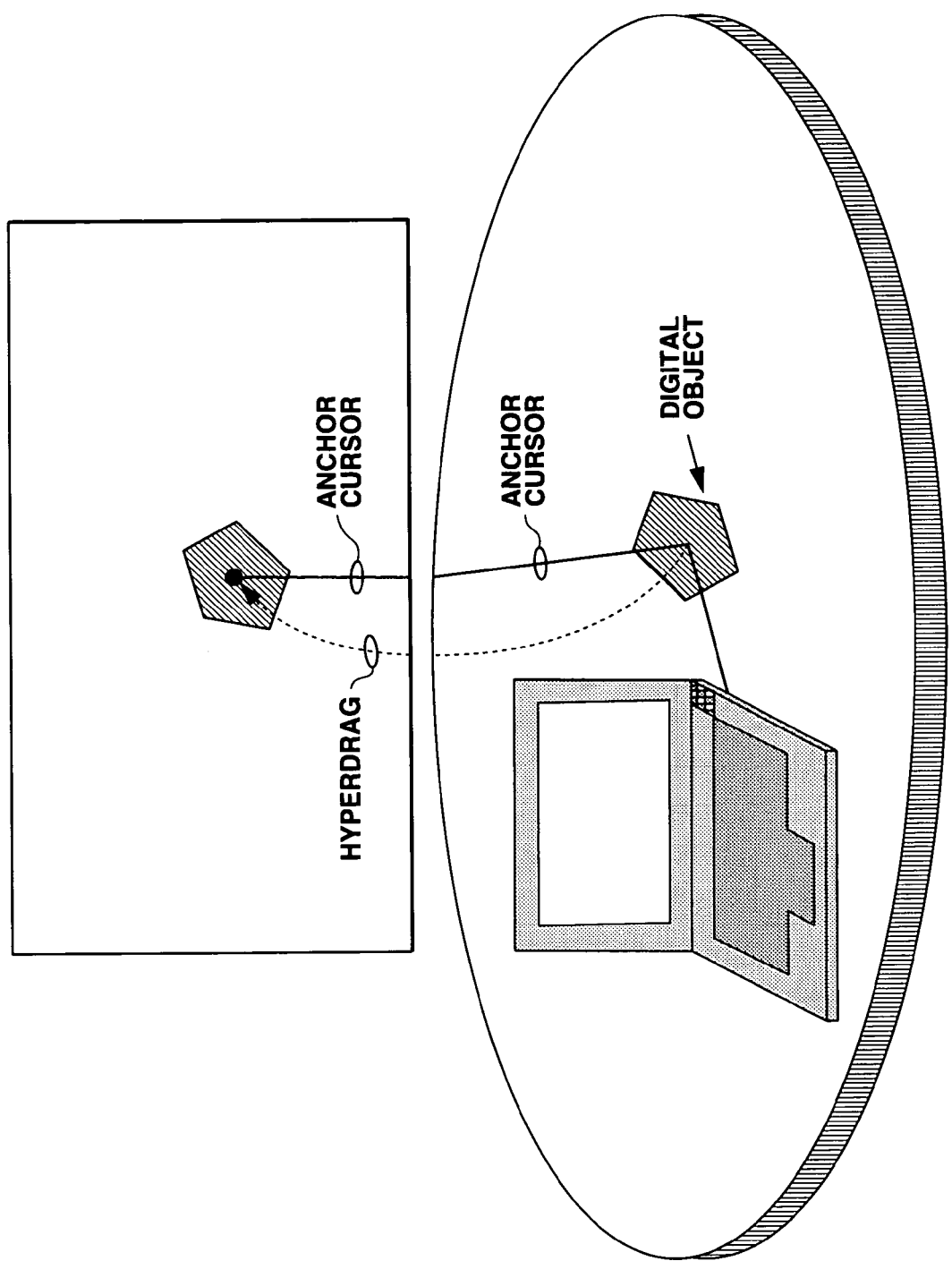
FIG. 3 is a schematic illustration of another Hyperdrag operation and, more specifically, it shows how a dig object that has jumped out from the display screen of a computer onto the table carrying the computer is further "hyperdragged" to move onto a wall.
Figure 4:
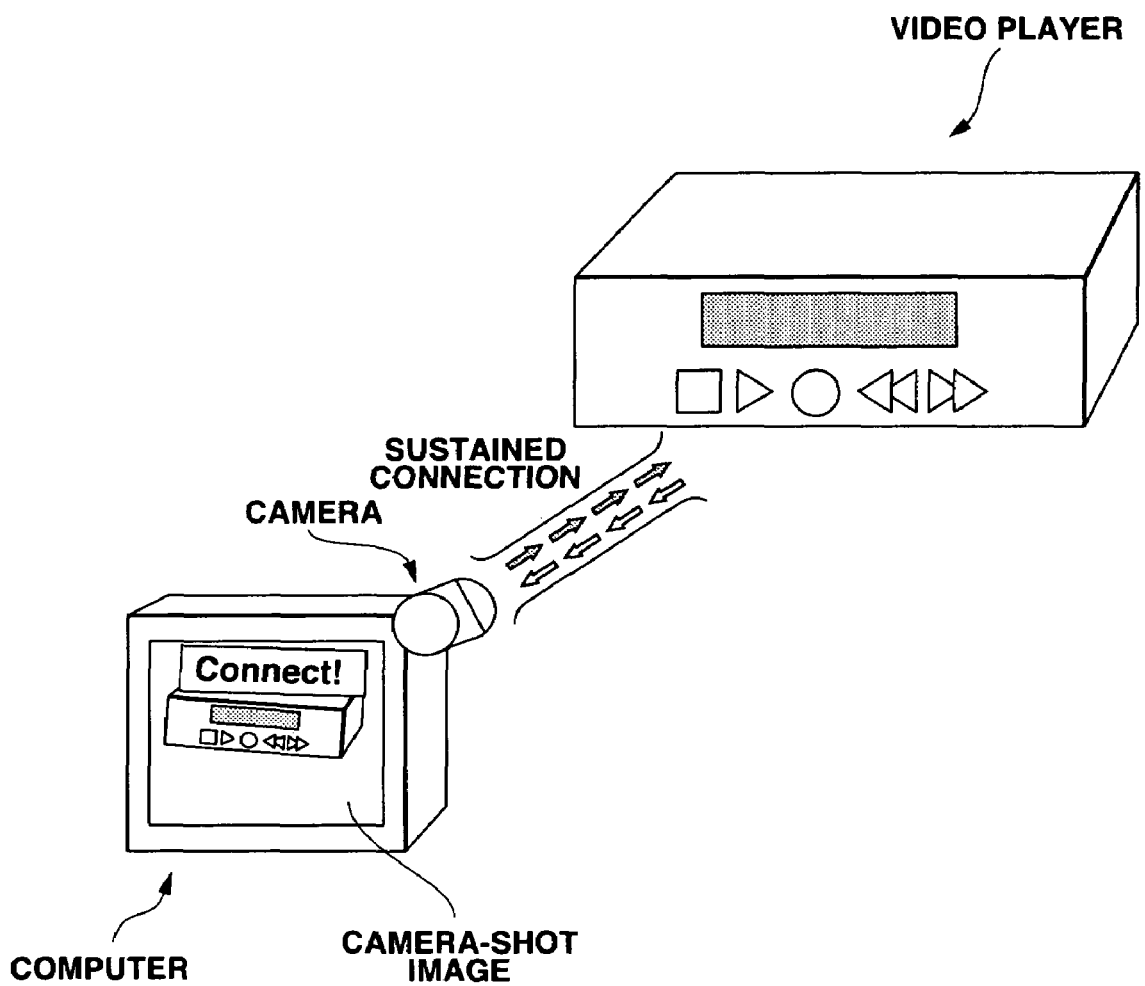
FIG. 4 is a schematic illustration of an operation using the feature of "gaze-link" metaphor according to the invention.
Figure 5:
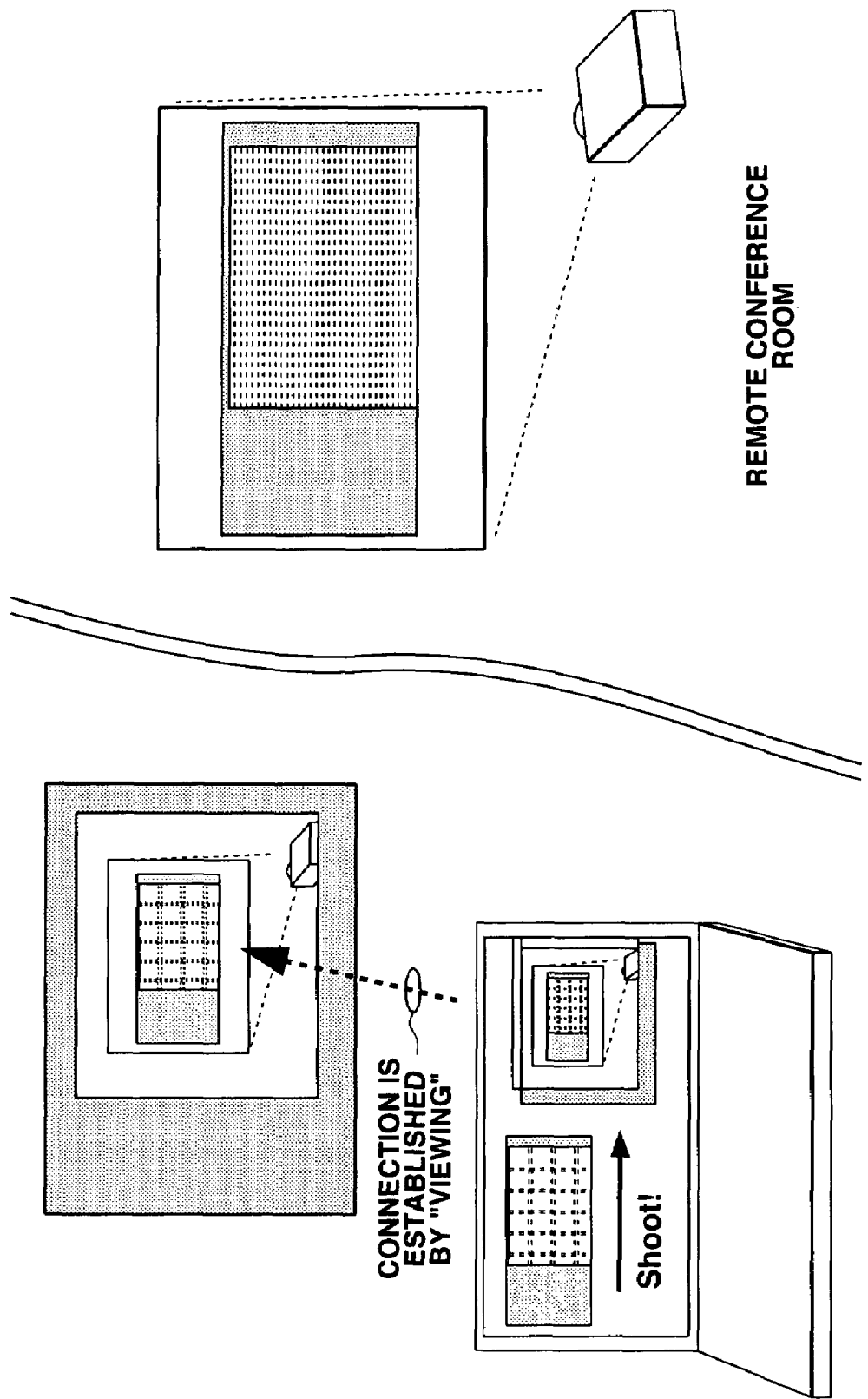
FIG. 5 is a schematic illustration of a metaphoric feature with which an image is "viewed" indirectly and an object shown in the image is connected and, more specifically, it shows a scene of teleconference, where the display screen of a remote site is connected and shot by a camera by means of the metaphoric feature.
Figure 6:
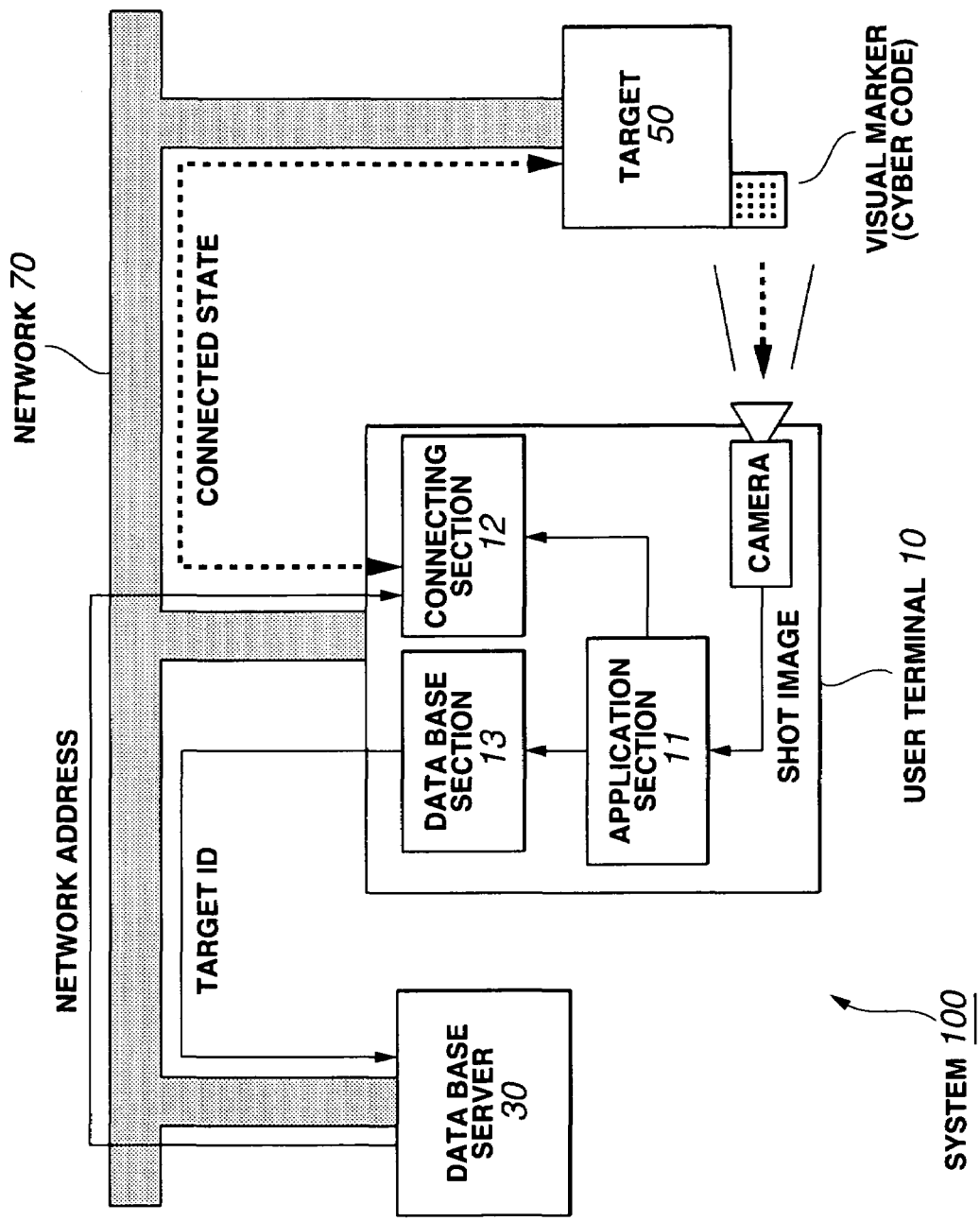
FIG. 6 is a schematic block diagram of a computer system that can provide the feature of "gaze-link" metaphor, which is a real world-oriented interface according to the invention.

FIG. 6 is a schematic block diagram of a computer system that can provide the feature of "gaze-link" metaphor, which is a real world-oriented interface according to the invention. Referring to FIG. 6, system 100 for the feature of "gaze-link" metaphor comprises one or more than one user terminal 10 and one or more than one devices, or targets 50), that can be connected to the user terminal. While FIG. 6 shows only a single user terminal 10 and a single target 50, there may be a number of user terminals and targets in a single word space where network 70 is installed.

The real world-oriented interface that operates on the system 100 has a metaphoric feature of connecting the user terminal and the target by "viewing" the target. In parallel with the realization of the metaphoric feature (or in the background thereof), the user terminal 10 and the target 50 are connected to each other by way of a LAN (local area network) and/or some other telecommunication network 70 in order to exchange data and commands. Note, however, it is sufficient for the user terminal 10 and the target 50 that they can be connected to each other by some means and they do not have to be located in close proximity, e.g., in a same room. In other words, they may be located in a remote environment where they are located in different rooms, floors or buildings and the user (terminal) cannot directly "view" the target.

For the purpose of the present invention, the network protocol is not limited to a specific one. For instance, the LAN may be Ethernet (including both wired and wireless) or Bluetooth [1].

The user terminal 10 represents a computer system that provides a real world-oriented interface adapted to connect itself to the target 50 by viewing the latter. The present invention is by no means limited to any specific system architectures for computers. The user terminal 10 typically is compatible with IBM's PC/ATs (personal computer/advanced technology) and their successors in terms of specifications. Note, however, that it should be equipped with a network interface card (NIC) or equivalent in order to interconnect itself and the target 50.

As far as this embodiment is concerned, to "view" an object means that it shoots the physical object in the real world by means of a camera (and recognizes/identifies the imaged object) and to connect by "viewing" means that the picked up image of the object is displayed on the display screen of the computer to show the connected state.

To establish connection between the user terminal 10 and the target 50 that is "viewed" and hence imaged, the former has to recognize the target 50 to begin with. Therefore, for this embodiment, it is assumed that the target 50 includes a visual marker such as an ID code that can be visually identified. The ID code may be, for example, a bar code in the form of a two-dimensional matrix such as Cybercode/*/. The target 50 may be any information device or information-oriented home appliance that can be connected to a telecommunication network. For example, it may be a video recording/reproduction apparatus, an electric kettle or a projector.

Figure 7:
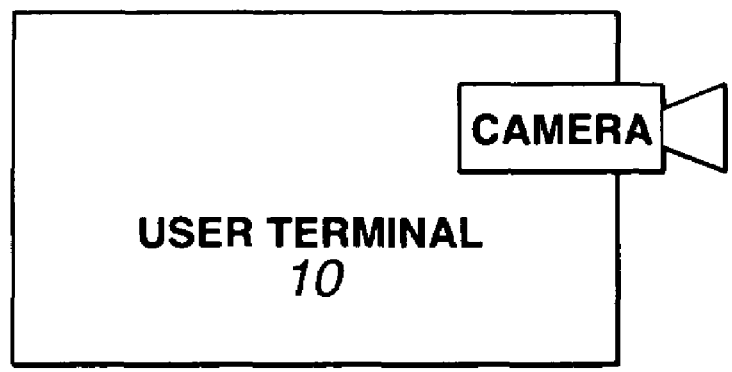
FIG. 7 is a schematic illustration of a user terminal 10 equipped with a camera or a user terminal 10 comprising a camera as an integral part thereof.
Figure 8:
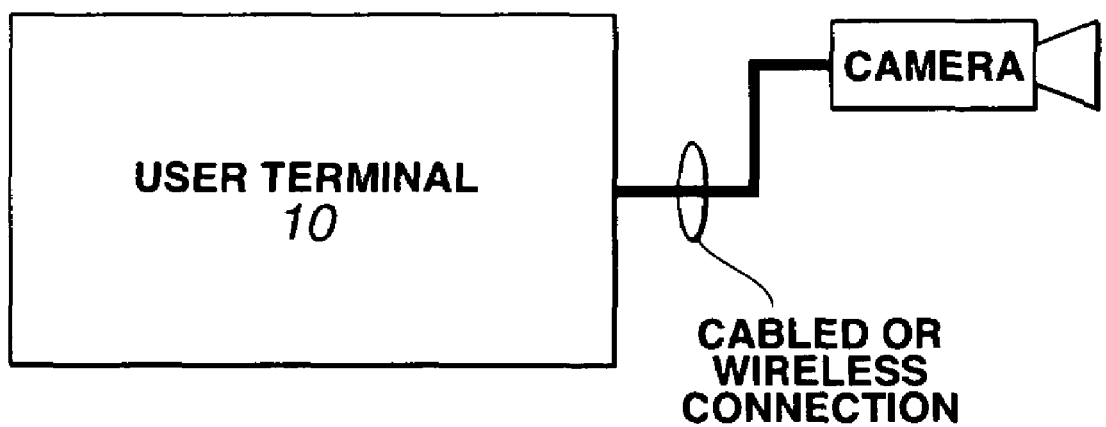
FIG. 8 is a schematic illustration of a user terminal 10 equipped with a camera or a user terminal 10 to which a camera is connected by way of a cable.

The user terminal 10 has to be equipped with an imaging means, which is typically a camera for "viewing" the object, although the camera may be contained in the user terminal 10 (see FIG. 7) or located outside the user terminal 10 (see FIG. 8). A specific example of the user terminal 10 may be "Sony VAIO-CIR", which is a notebook type computer comprising a camera as integral part thereof, available from Sony Corporation. Such a user terminal 10 can be connected to an outside camera by means of a serial (RS-232C) port or an IEEE 1394 (i-Link) port and a cable.

Figure 9:
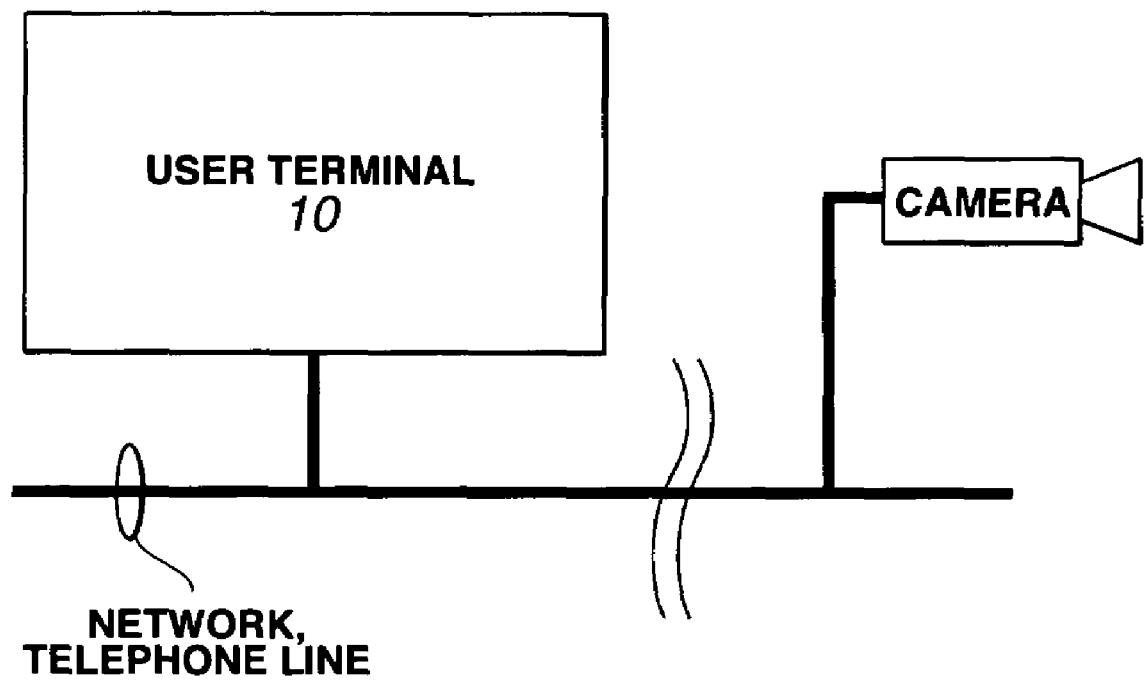
FIG. 9 is a schematic illustration of a user terminal 10 equipped with a camera or a user terminal 10 to which a remote camera is connected by way of a telecommunication network and/or telephone lines.

Furthermore, the user terminal 10 may utilize a camera located on a remote site and connected by way of Ethernet (including both wired and wireless) and/or BlueTooth [1] (see FIG. 9). Or, the user terminal 10 may not be equipped with a camera but can be in a state of "viewing" the target by retrieving a still image of the target stored in a local storage disk thereof and displaying it on the display screen.

As shown in FIG. 6, the user terminal comprises an application section 11, connecting section 12 and a data base section 13.

The application section 11 by turn is formed by the following modules.

(1) A module for recognizing/identifying the ID of the target on the basis of the ID code contained in a picked up image of the target 50.

(2) A module for holding the snap shot of the recognized/identified target 50 obtained when it is "viewed" on the display screen selecting it by clicking it by means of a pointing device.

(3) A module for exchanging data with the selected target or the target that is being "viewed".

The data base section 13 is a module for converting the ID of the target 50 into its network address. Upon identifying the ID code of the target 50 in the picked up image, the application section 11 refers to the data base section 13 for the ID. Then, the data base section 13 returns the network address corresponding to the ID. Then, the application section 11 specifies the network address to the connecting section 12 to establish connection between the user terminal 10 and the target 50.

The entire data base containing the data describing the correspondence of the ID of each of the possible targets and its network address may be held under control of the user terminal 10. If the data base has to be shared with some other user terminal 10 or it has a large size due to the fact that a large number of targets exist on the network 70, the operation of controlling the data base may be entirely or partly assigned to a dedicated data base server 30 on the network 70. Then, the user terminal 10 inquires of the data base server 30 the ID of the target 50 and the data base server 30 sends the network address of the target 50 to the user terminal 10.

The user terminal 10, the target 50, the data base server 30 and other devices on the network 70 can exchange messages typically according to the TCP/IP (transmission control protocol/internet protocol). If a large volume of data has to be transferred due to a large image size or for some other reason, the feature of sharing a file may be utilized. Functional modules such as the application section and the server may be described by means of Java Programming Language (an object-oriented programming language developed by Sun Microsystems of U.S.A.

Figure 10:
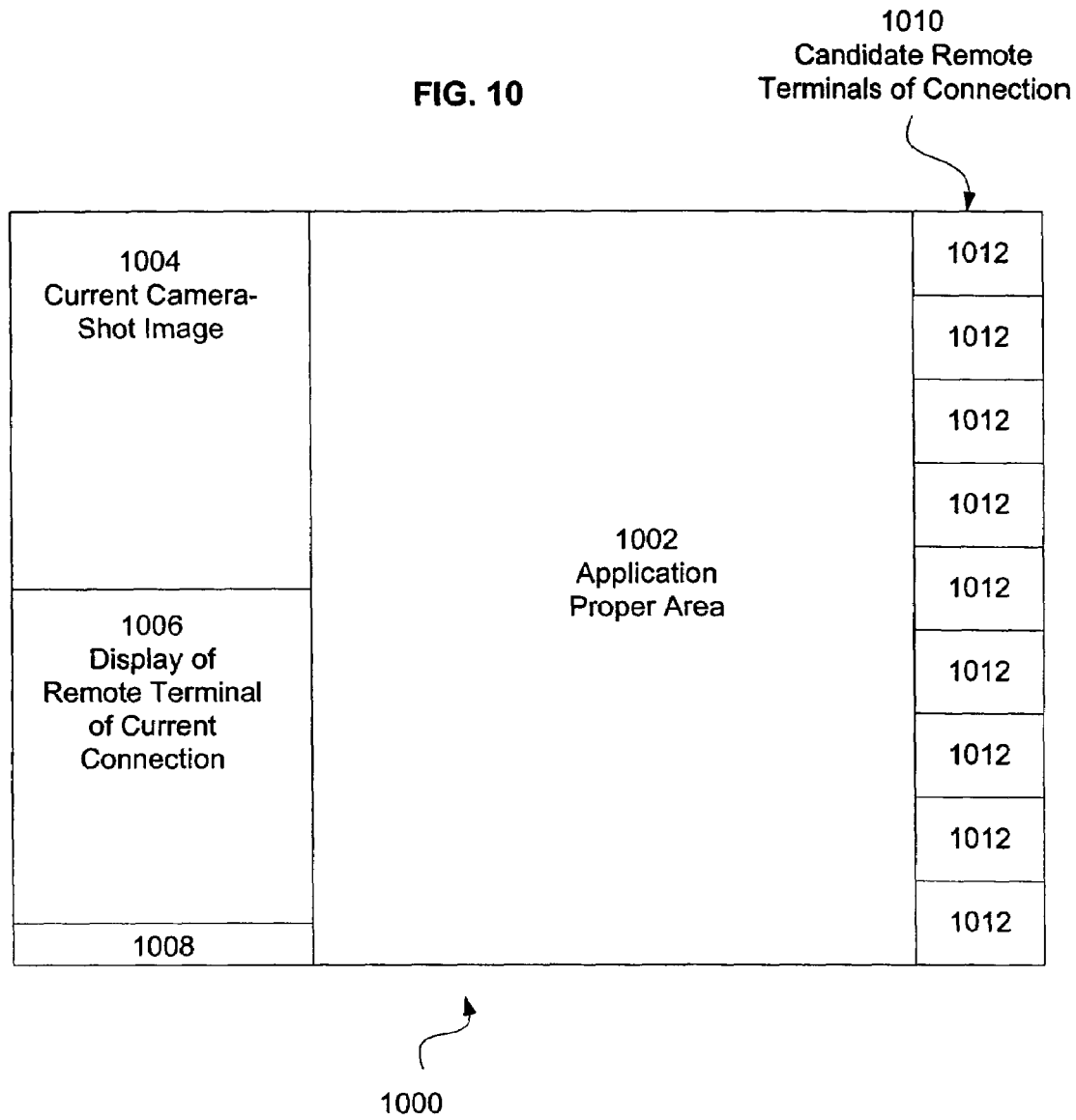
FIG. 10 is a schematic illustration of a display screen.

FIG. 10 is a schematic illustration of a display screen 1000.

The central area 1002 of the display screen 1000 is the area to be used by the application main body.

The upper left display area 1004 of the display screen 1000 shows the image currently being picked up by the camera. The lower left display area 1006 of the display screen 1000 shows the image currently being picked up of the connected device. The currently connected device is a device being "viewed", which is a device that is being shot by the camera or selected by some other means. An image taken by the camera of the display monitor that is currently connected can be displayed. If the connected target has a name or an ID, it may be displayed along the lower edge 1008 of the window frame.

A list of the devices 1010 that can be connected is shown at the right end of the display screen 1000. The list of the devices 1010 to be connected is realized in the form of a buttons 1012 representing the (still) images of the respective target devices to be connected that are taken by a camera and arranged in time series. The connection procedure for connecting a desired target and the user terminal 10 can be called by selecting (clicking) the button representing the target.

Figure 11:
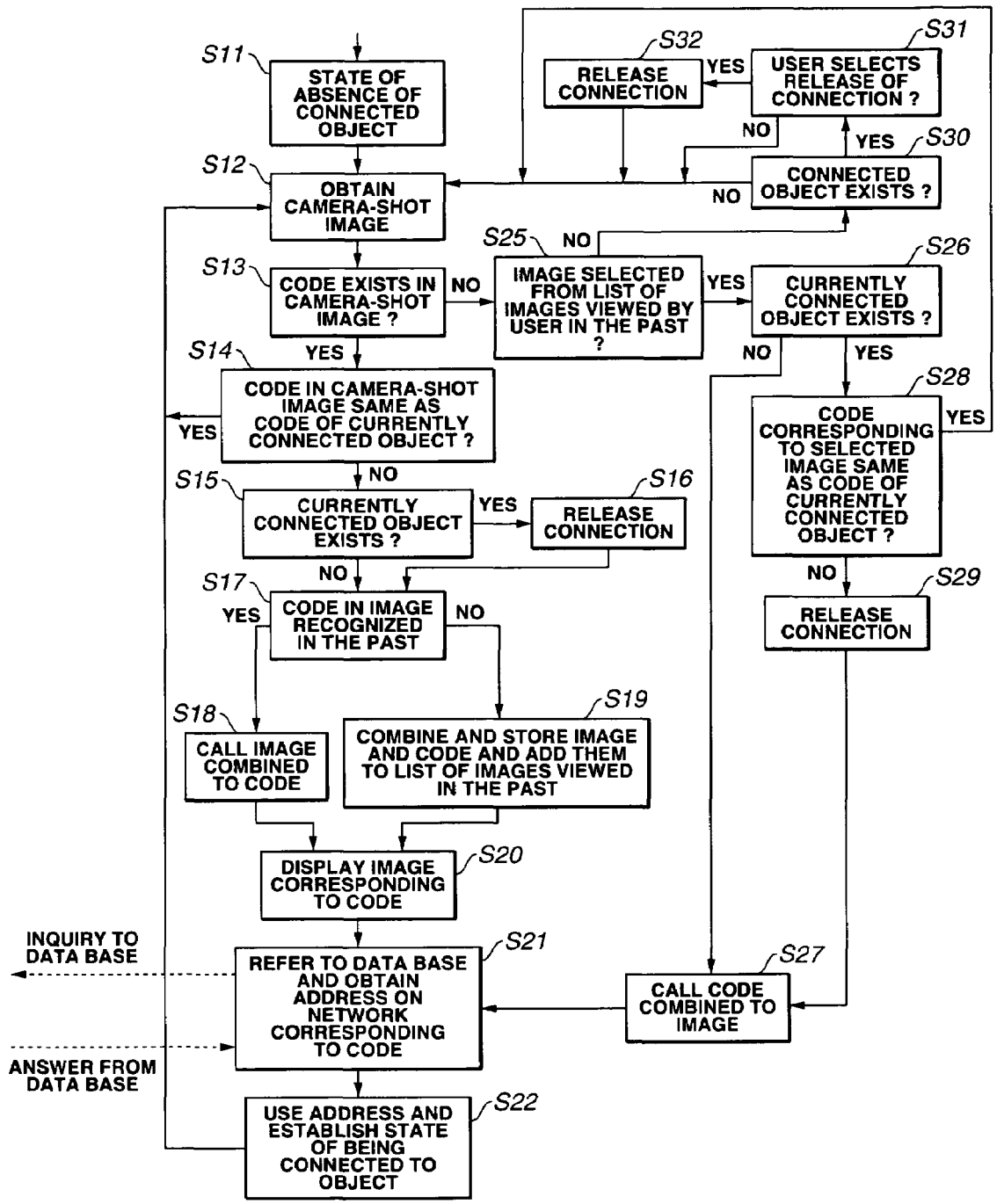
FIG. 11 is a flow chart of the processing operation of the connecting section 12 for connecting a single target 50.

FIG. 11 is a flow chart of the sequence the processing operation of the connecting section 12 for connecting a single target 50. In other words, the user terminal 10 can be connected only to a single target.

Initially, the connecting section is in a standby state due to absence of any object to be connected (Step S11).

As the camera shoots a target, the application section 11 obtains the camera-shot image (Step S12) and carries out a predetermined processing operation for recognizing/identifying the image to determine if the camera-shot image contains an ID code such as cyber code. (Step S13).

If the camera-shot image contains an ID code, the application section 11 further determines if the recognized ID code is same as that of the target being connected or not (Step S14). If the two ID codes agree with each other, the operation returns to Step S12 to repeat the above steps because the object to be connected does not need to be switched.

If, on the other hand, it is determined in Step S14 that the recognized ID code is different from that of the target to be connected, the application section further determines if the target being connected exists or not (Step S15). If the target being connected exists, the application section 11 releases the connection (Step S16) and proceeds to the next step S17.

In Step S17, it is determined if the ID code found in the camera-shot image was recognized in the past or not. If it was recognized in the past, the image coupled to the ID code is retrieved from the local storage disk and displayed on the display screen (Step S18). If, on the other hand, the ID code has not been recognized, the ID code is coupled to the current camera-shot image and added it to the "list of the targets to be connected" containing the targets that were viewed in the past (Step S19). Then, in Step S20, the image coupled to the ID code is displayed on the display screen.

Then, in Step S21, the application section 11 places an inquiry to the data base server 30 and obtain the network address of the target corresponding to the ID code. Thereafter, in Step S22, connection to the target is established by using the obtained network address.

It will be appreciated that the user only needs to shoot the target by means of a camera in order to establish connection to the target if the feature of "gaze-link" metaphor is installed. Then, the user terminal 10 recognizes the ID code attached to the target on the basis of the camera-shot image and automatically reads out the network address corresponding to the ID code.

On the other hand, if it is determined in Step S13 that the camera-shot image does not contain any ID code, the operation proceeds to Step S25, where it is determined if the user selects an image from the "list of the targets to be connected" containing the targets that were viewed in the past or not.

If it is determined that the user selects an image form the "list of the targets to be connected", the operation proceeds to Step S26, where it is determined if there is a target that is currently connected to the user terminal or not. If it is determined that there if no target that is currently connected to the user terminal, the ID code coupled to the selected image is retrieved (Step S27) and then the operation proceeds to Step S21 to establish connection to the target shown in the image selected from the "list of the targets to be connected" (Step S27).

If, on the other hand, it is determined in Step S26 that there is a target currently connected tot he user terminal, the operation proceeds to Step S28 to determine if the ID code corresponding to the selected image and that of the target being connected agree with each other or not. If they agree, the operation returns to Step S12 to repeat the above steps because it is only necessary to maintain the connection. If, on the other hand, they do not agree, the current connection to the target is released (Step S29) and the operation proceeds to Step S27 to establish connection to the target shown in the image selected from the "list of the targets to be connected".

If the user does not select any image from the "list of the targets to be connected" in Step S25, the operation proceeds to Step S30 to determine if there is a target that is currently connected to the user terminal or not.

If there is no target that is currently connected, the operation returns to Step S12 to repeat the above steps.

If, on the other hand, there is a target that is currently connected, the operation proceeds to Step S31 to determine if the user releases the connection or not. The operation returns to Step S12 if the user does not select the release of the connection, whereas the operation proceeds to Step S32 to release the connection and returns to Step S12 to repeat the above steps if the user selects the releases of the connection.

Figure 12:
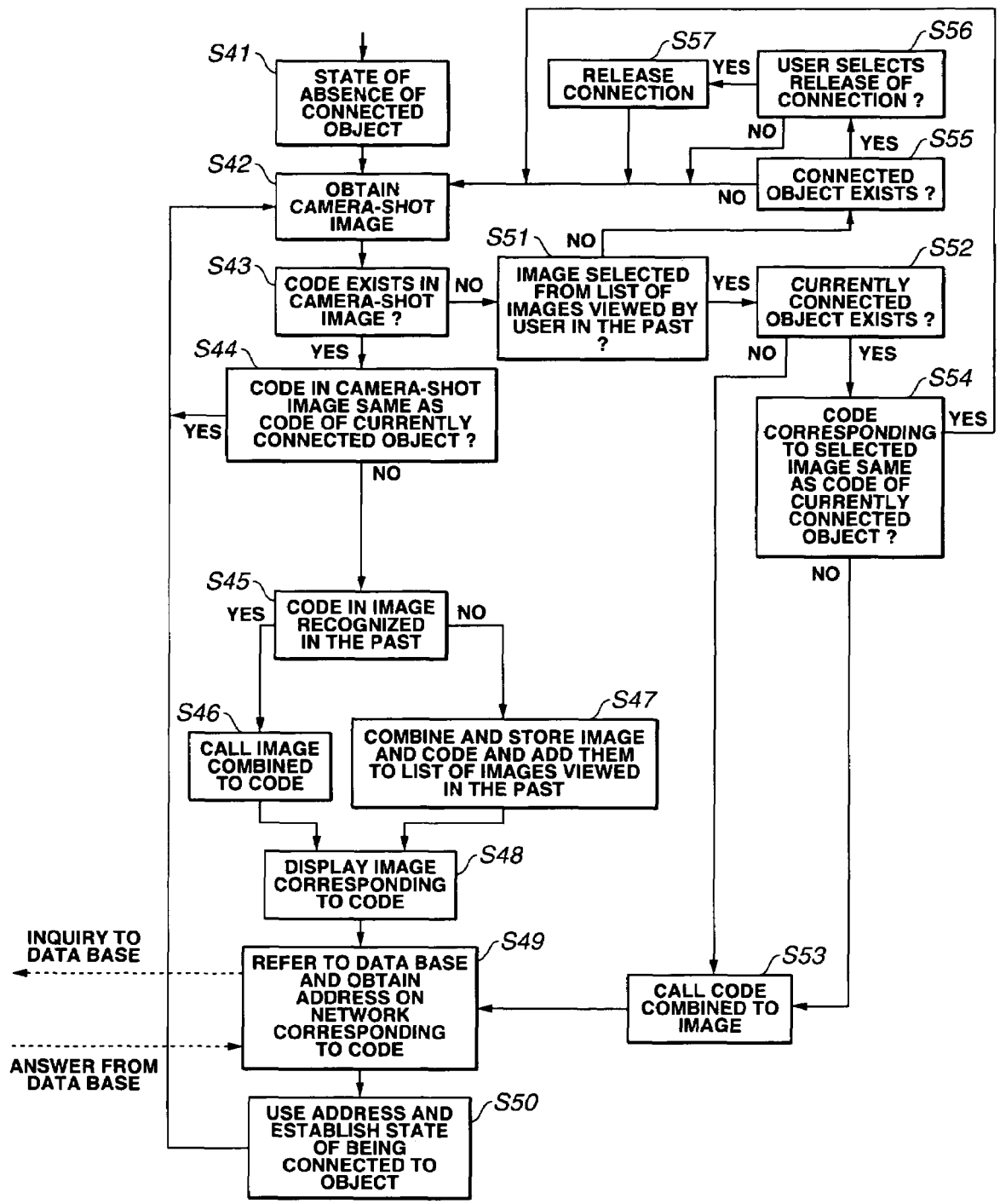
FIG. 12 is a flow chart of the processing operation of the connecting section 12 for connecting a plurality of targets simultaneously.

FIG. 12 is a flow chart of the processing operation of the connecting section 12 that is followed when the user terminal can be connected a plurality of targets simultaneously. Now the operation will be described by way of the steps of FIG. 12.

Initially, the connecting section is in a standby state due to absence of any target to be connected (Step S41).

As the camera shoots a target, the application section 11 obtains the camera-shot image (Step S42) and carries out a predetermined processing operation for recognizing/identifying the image to determine if the camera-shot image contains an ID code such as cyber code. (Step S43).

If the camera-shot image contains an ID code, the application section 11 further determines if the recognized ID code is same as that of the target being connected or not (Step S44). If the two ID codes agree with each other, the operation returns to Step S42 to repeat the above steps because the object to be connected does not need to be switched.

If, on the other hand, it is determined in Step S44 that the newly recognized ID code is different from that of the object to be connected, the application section 11 proceeds to Step S45 where it further determines if the ID code found in the camera-shot image was recognized in the past or not. If it was recognized in the past, the image coupled to the ID code is retrieved from the local storage disk and displayed on the display screen (Step S46). If, on the other hand, the ID code has not been recognized, the ID code is coupled to the current camera-shot image and added it to the "list of the targets to be connected" containing the targets that were viewed in the past (Step S47). Then, in Step S48, the image coupled to the ID code is displayed on the display screen.

Thereafter, in Step S49, the application section 11 places an inquiry to the data base server 30 and obtain the network address of the target corresponding to the ID code. Thereafter, in Step S50, connection to the target is established by using the obtained network address.

It will be appreciated that the user only needs to shoot the target by means of a camera in order to establish connection to the target if the feature of "gaze-link" metaphor is installed. Then, the user terminal 10 recognizes the ID code attached to the target on the basis of the camera-shot image and automatically reads out the network address corresponding to the ID code.

On the other hand, if it is determined in Step S43 that the camera-shot image does not contain any ID code, the operation proceeds to Step S51, where it is determined if the user selects an image from the "list of the targets to be connected" containing the targets that were viewed in the past or not.

If it is determined that the user selects an image form the "list of the targets to be connected", the operation proceeds to Step S52, where it is determined if there is a target that is currently connected to the user terminal or not. If it is determined that there if no target that is currently connected to the user terminal, the ID code coupled to the selected image is retrieved (Step S53) and then the operation proceeds to Step S49 to establish connection to the target shown in the image selected from the "list of the targets to be connected" (Step S53).

If, on the other hand, it is determined in Step S52 that there is a target currently connected tot he user terminal, the operation proceeds to Step S54 to determine if the ID code corresponding to the selected image and that of the target being connected agree with each other or not. If they agree, the operation returns to Step S42 to repeat the above steps because it is only necessary to maintain the connection. If, on the other hand, they do not agree, the operation proceeds to Step S53 to establish connection to the target shown in the image selected from the "list of the targets to be connected".

If the user does not select any image from the "list of the targets to be connected" in Step S51, the operation proceeds to Step S55 to determine if there is a target that is currently connected to the user terminal or not.

If there is no target that is currently connected, the operation returns to Step S42 to repeat the above steps.

If, on the other hand, there is a target that is currently connected, the operation proceeds to Step S56 to determine if the user releases the connection or not. The operation returns to Step S42 if the user does not select the release of the connection, whereas the operation proceeds to Step S57 to release the connection and returns to Step S42 to repeat the above steps if the user selects the releases of the connection.

As described above, in Step S21 of the flow chart of FIG. 11 and in Step S49 of the flow chart of FIG. 12, the data base section 13 or the data base server 30 is inquired of for the ID code that the target has and returns the relevant network address. The operation of the inquiry and answer sequence involving the data base server 30 will be described below.

Figure 13:
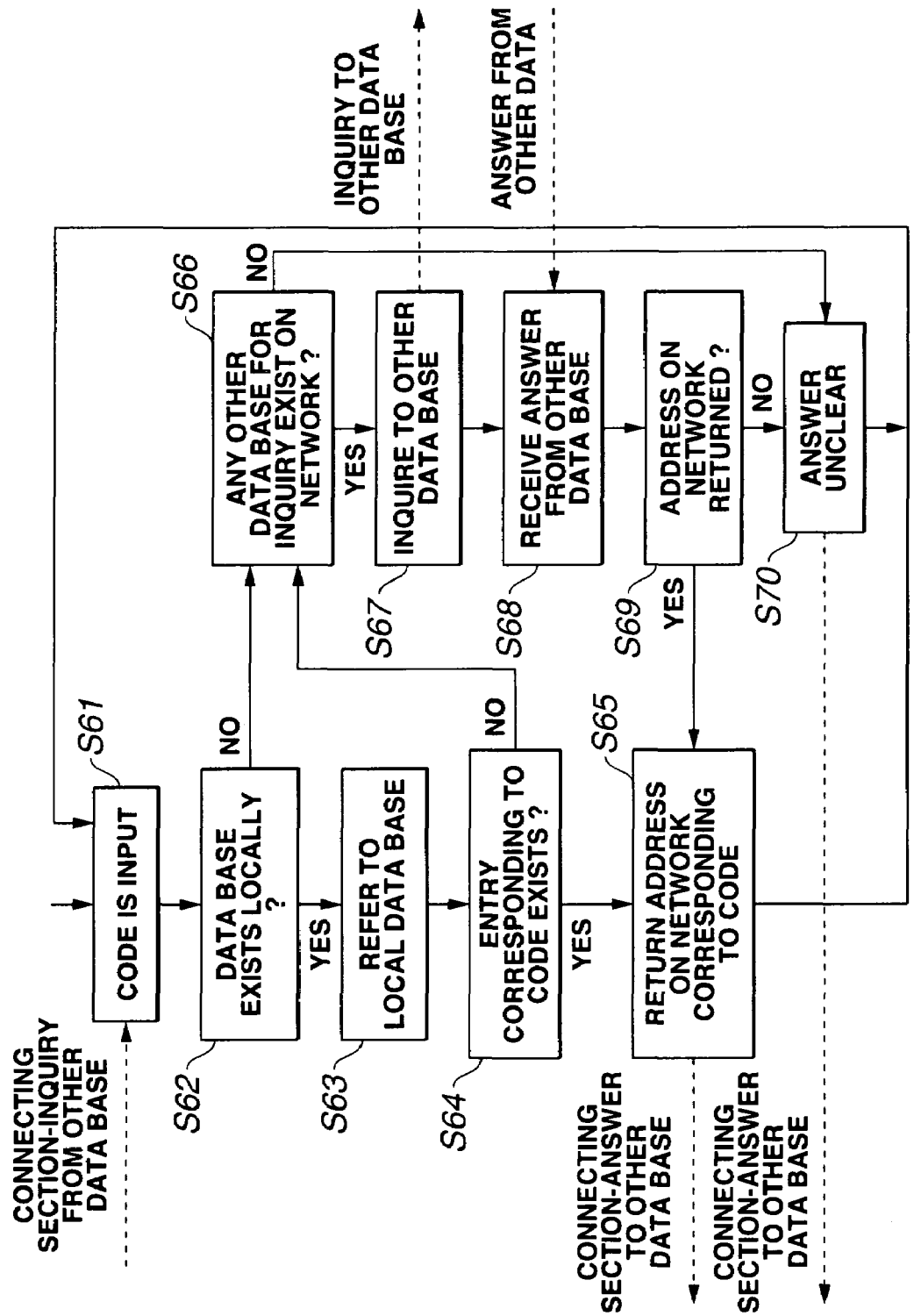
FIG. 13 is a flow chart of the processing operation of an "inquiry and answer" sequence.

FIG. 13 is a flow chart of the processing operation of an "inquiry and answer" sequence. In the instance of FIG. 13, if the data base section 13 or the data base server 30 does not have any entry of the inquired ID code, it places an inquiry to other data base servers that can be located on the network about the ID code in a client/server format. Now, the steps of the flow chart will be discussed below.

Upon receiving an inquiry about an ID code from the connecting section 12 or some other data base server (Step S61), the data base server 30 determines if it has a local data base of its own or not (Step S62).

If it possesses a local data base, it refers to it (Step S63) and determines if the local data base contains an entry of the input ID code or not (Step S64).

If the local data base contains an entry, it retrieves the network address of the ID code and returns it to the inquirer (Step S65). Thereafter, it returns to Step S61 to wait for the next inquiry.

If, on the other hand, it is determined in Step S62 that the data base server 30 does not possess any local data base of its own, it determines if there is a data base server on the network to which it can place an inquiry or not (Step S66).

If it finds a data base server on the network, it forwards the inquiry about the ID code (Step S67) and receives the network address as answer to the inquiry (Step S68).

Thus, if the data base server 30 succeeds to obtain the network address from some other data base server (Step S69), the operation proceeds to Step S65 to give the network address to the inquirer, who may be the connecting section. If, on the other hand, the data base server 30 fails to obtain the network address, it notifies the inquirer, who may be the connecting section, of the fact that the network address is not known (Step S70).

If it is determined in Step S64 that the local data base does no contain any entry of the input ID code, it also determines if there is a data base server on the network to which it can place an inquiry or not (Step S66).

If it finds a data base server on the network, it forwards the inquiry about the ID code (Step S67) and receives the network address as answer to the inquiry (Step S68).

Thus, if the data base server 30 succeeds to obtain the network address from some other data base server (Step S69), the operation proceeds to Step S65 to give the network address to the inquirer, who may be the connecting section. If, on the other hand, the data base server 30 fails to obtain the network address, it notifies the inquirer, who may be the connecting section, of the fact that the network address is not known (Step S70).

Figure 14:
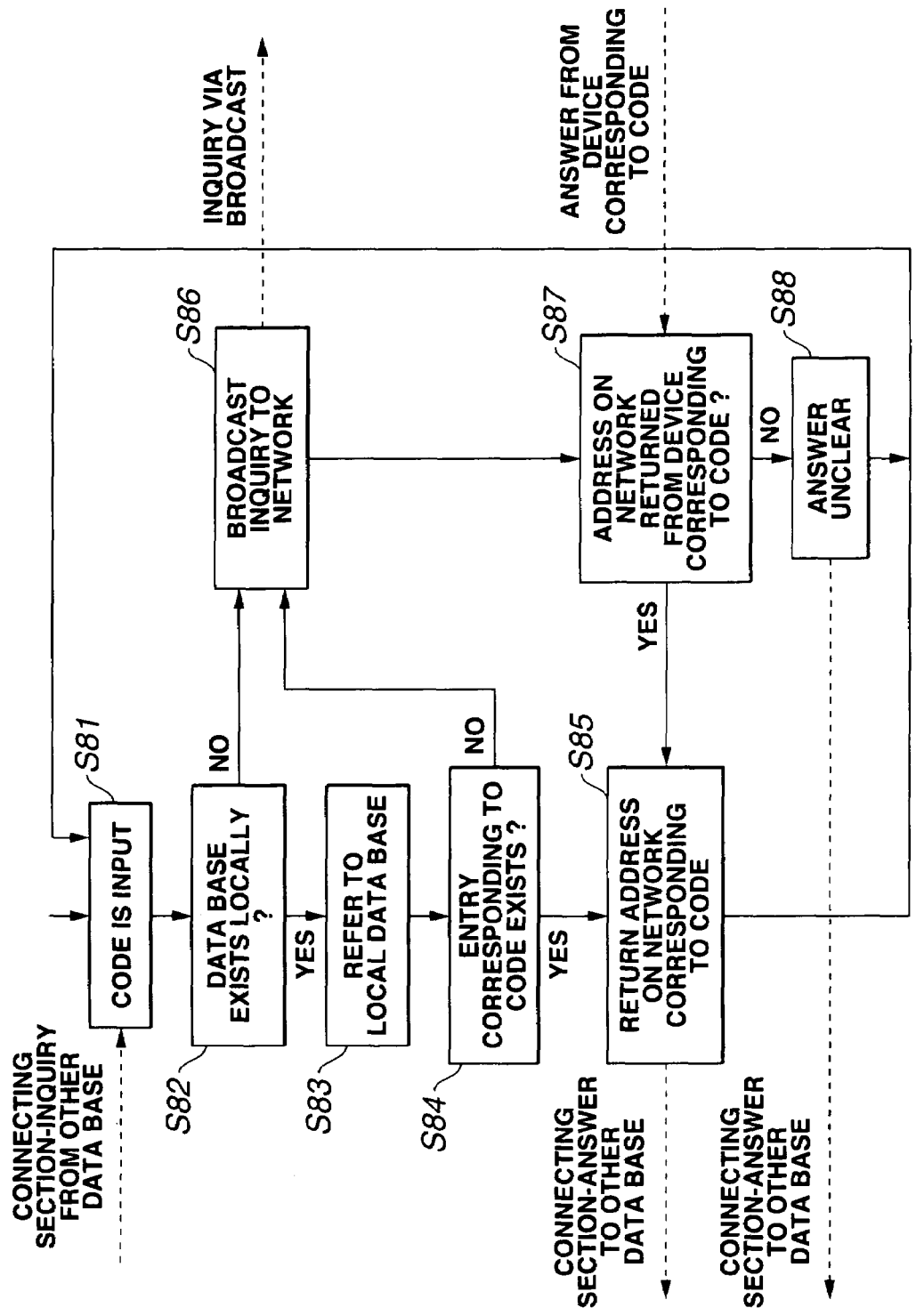
FIG. 14 is a flow chart of the processing operation of another "inquiry and answer" sequence.

FIG. 14 is a flow chart of the processing operation of another "inquiry and answer" sequence. In the instance of FIG. 14, if the data base section 13 or the data base server 30 does not have any entry of the ID code about which an inquiry is placed, it places an inquiry about the ID code to other data base server that cannot be located on the network in a broadcast format. Now, the steps of the flow chart will be discussed below.

Upon receiving an inquiry about an ID code from the connecting section 12 or some other data base server (Step S81), the data base server 30 determines if it has a local data base of its own or not (Step S82).

If it possesses a local data base, it refers to it (Step S83) and determines if the local data base contains an entry of the input ID code or not (Step S84).

If the local data base contains an entry, it retrieves the network address of the ID code and returns it to the inquirer (Step S85). Thereafter, it returns to Step S81 to wait for the next inquiry.

If, on the other hand, it is determined in Step S82 that the data base server 30 does not possess any local data base of its own, it broadcasts the inquiry about the ID code onto the network (Step S86).

If the data base server 30 succeeds to obtain the network address from some other data base server as a result of the broadcasting (Step S87), the operation proceeds to Step S85 to give the network address to the inquirer, who may be the connecting section. If, on the other hand, the data base server 30 fails to obtain the network address, it notifies the inquirer, who may be the connecting section, of the fact that the network address is not known (Step S88).

If it is determined in Step S84 that the local data base does no contain any entry of the input ID code, it also broadcasts the inquiry about the ID code onto the network (Step S86).

If the data base server 30 succeeds to obtain the network address from some other data base server as a result of the broadcasting (Step S87), the operation proceeds to Step S85 to give the network address to the inquirer, who may be the connecting section. If, on the other hand, the data base server 30 fails to obtain the network address, it notifies the inquirer, who may be the connecting section, of the fact that the network address is not known (Step S88).

Now, an applications that can be provided by a system 100 realizing the feature of "gaze-link" metaphor will be discussed below.

(1) Presentation TOOL

Figure 15:
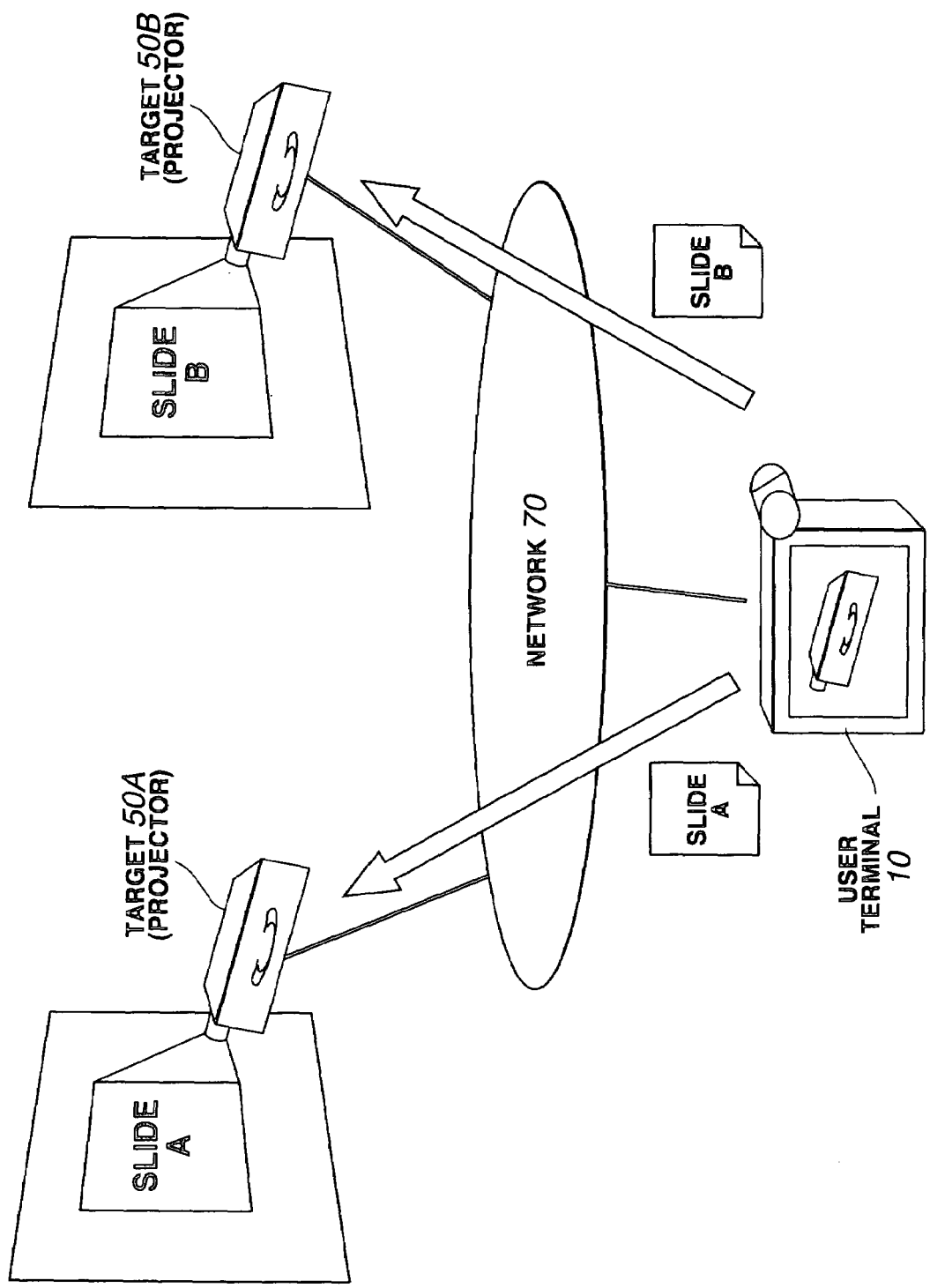
FIG. 15 is a schematic illustration of the feature of "gaze-link" metaphor as applied to a presentation tool, where the transparencies stored in the user terminal are allocated to more than one targets including one or more than one displays and/or one or one or more than one projectors.

A number of transparencies stored in the user terminal can be allocated to one or more than one targets such as displays and projectors by applying the feature of "gaze-link" metaphor to a presentation tool (see FIG. 15).

The transparencies transferred to the displays and the projectors can be operated at the user terminal (e.g., the user can show them one by one or can show them as moving picture whose motion can be suspended temporarily).

Figure 16:
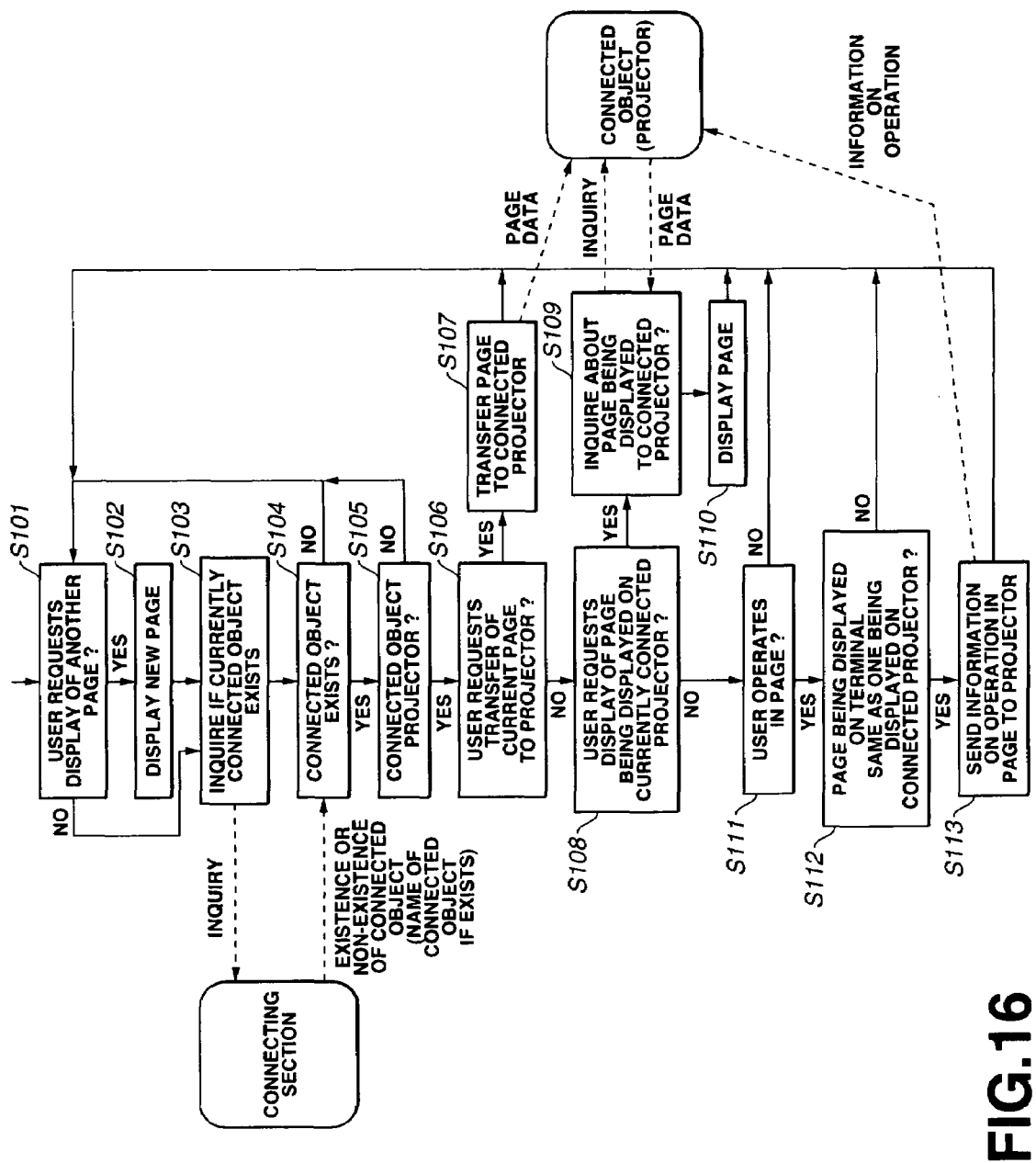
FIG. 16 is a flow chart of the processing operation of the feature of "gaze-link" metaphor as applied to a presentation tool.

FIG. 16 is a flow chart of the processing operation of the feature of "gaze-link" metaphor as applied to a presentation tool. Now, the steps of the flow chart will be discussed below.

The processing operation proceeds with the process of presentation of displaying transparencies by means of the user terminal 10.

If the user requests some other transparency (Step S101), the requested one is displayed on the user terminal 10 (Step S102), whereas the current transparency remains on the display screen if the user does not request any other transparency.

Then, in Step S103, the connecting section 12 is inquired if the user terminal 10 has a target to be connected or not. If the answer to the inquiry is no, the processing operation returns to Step S101 and repeats the above steps.

If the user terminal 10 has a target to be connected, it is determined if the target to be connected is a projector or some other device that can display transparencies or not (Step S104). If the target is a device that cannot display any transparency, the operation returns to Step S101 and repeats the above steps.

If, on the other hand, the target is a device that can display transparencies, the transparency is transferred to the projector (Step S107) in response to the request of the user of the user terminal 10 for transferring the current transparency to the projector (Step S106). A request for transferring a transparency may be issued in an intuitive way by using, for instance, "hyper-drag" and expanding the current GUI operation into the space of the real world. Transparencies are transferred by way of the network 70. After the completion of the transfer of data, the processing operation returns to Step S101 and repeats the above steps.

If the user requests that the transparency being displayed by the projector that is currently connected to the user terminal 10 to be displayed also on the user terminal 10 (Step S108), the projector that is currently connected is inquired about the transparency being displayed (Step S109) and the latter is actually displayed on the user terminal (Step S110). The transfer of data necessary for displaying a transparency proceeds automatically by way of the network 70. After displaying the transparency, the operation returns to Step S101 to repeat the above steps.

If the user does some action in the transparency (Step S111), which is also displayed by the projector that is currently connected (Step S112), information on the user's action in the transparency is also transferred (Step S113). As a result, the user's action is displayed on the projected image of the transparency. Thereafter, the processing operation returns to Step S101 to repeat the above steps.

(2) Keyboard

If a plurality of computers are located within a limited space and are provided with respective keyboards and displays, it may be very annoying to most people to operate them properly in such a complex situation. For example, there may be occasions where a user keys in a command on a command line on a display screen and does not know where the corresponding keyboard is. Then, he or she is forced to do a cumbersome operation of ensuring that the connection cable is connected property.

When a computer is shared by a number of people or a user borrows a computer from some other person, the user may experience the difficulty of getting accustomed to the key operation particularly when the key arrangement a is different from that of his or her own keyboard or the keyboard is provided with an input program (FEP (front end processor) different from that of the keyboard of his or her own.

However, it is now possible to use the keyboard of a computer that is "viewed" and hence connected to the user terminal.

For example, any application program can be installed into user's own computer by using the API (application programming interface) of the window system of the computer to which the user terminal is connected.

Additionally, a metaphoric feature of making the user terminal operate as telnet terminal of the computer that is "viewed" as target if it is so arranged that the echo back is also displayed. This feature will be very useful for operations on a server machine that does not usually need the user of a console or a built-in computer and operations for servicing devices having a limited console (e.g., printers).

Figure 17:
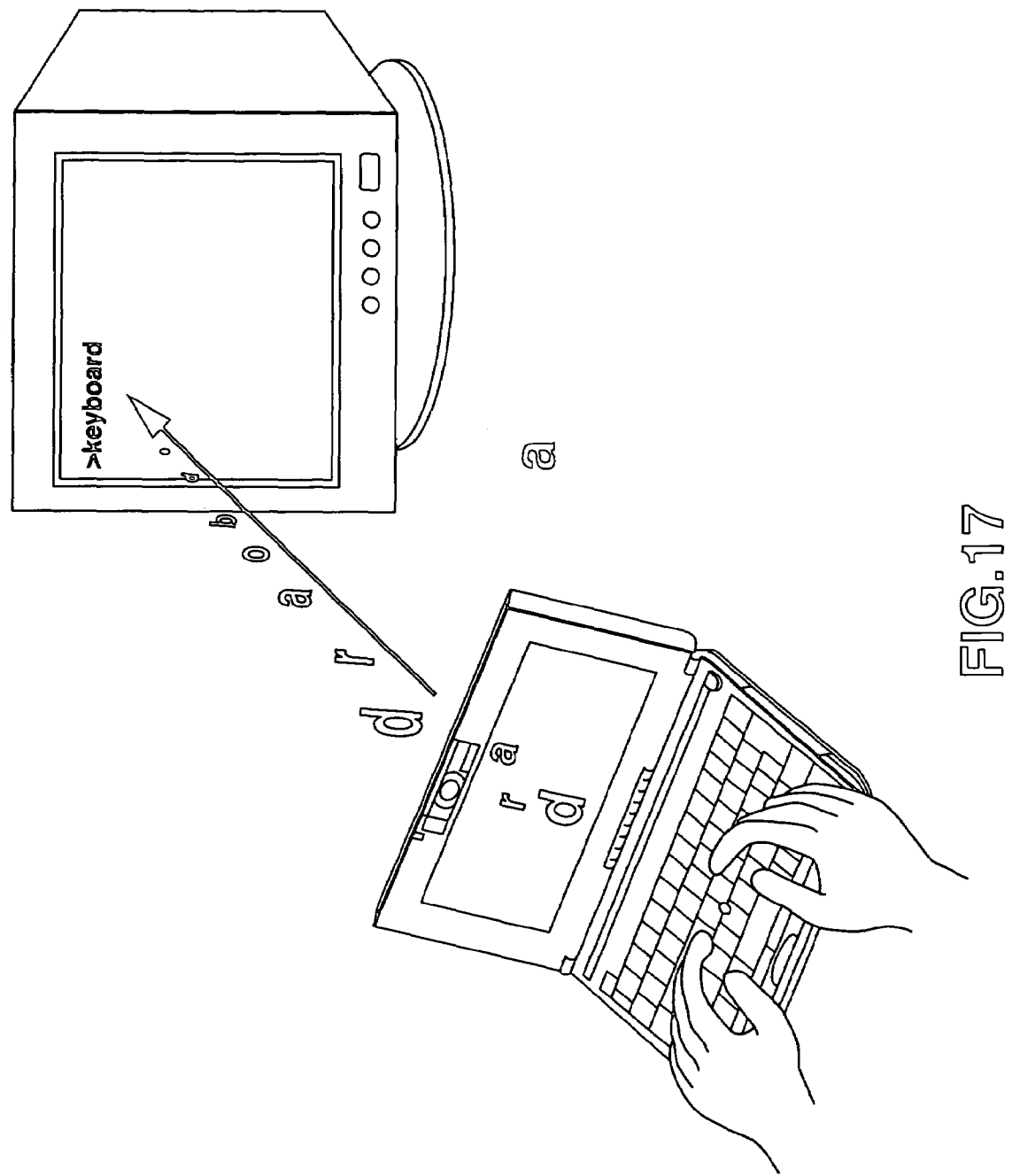
FIG. 17 is a schematic illustration of the feature of "gaze-link" metaphor as applied to a keyboard, where the keyboard of the user terminal operates as that of the computer that the user "viewed"

FIG. 17 is a schematic illustration of the feature of "gaze-link" metaphor as applied to a keyboard. As shown in FIG. 17, as the user "views" a computer (or identifies it by way of a camera-shot image thereof), the keyboard of the user terminal comes to operate as a remote keyboard of the computer. It is not necessary to connect the keyboard of the user terminal to the keyboard port of the remote computer.

Also as shown in FIG. 17, it may be so arranged that each character entered by a key input operation is displayed on the display screen of the user terminal in such a way that the user feels as if it were flying to the computer that is "viewed". Such a display will be effective for making the user recognize the target connected to the user terminal and the state where they are actually connected.

Figure 18:
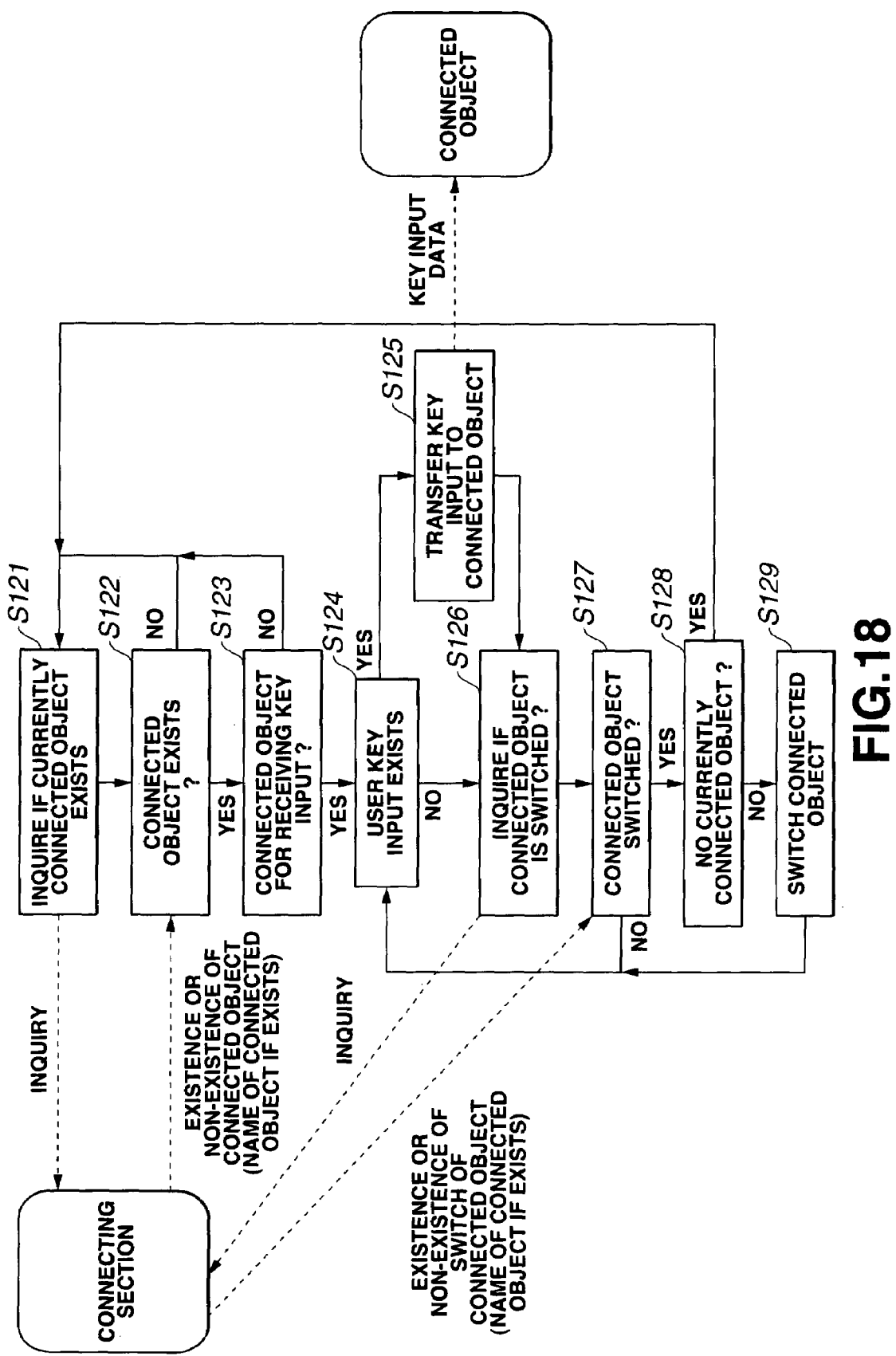
FIG. 18 is a flow chart of the processing operation of the feature of "gaze-link" metaphor as applied to a keyboard for a remote computer.

FIG. 18 is a flow chart of the processing operation of the feature of "gaze-link" metaphor as applied to a keyboard for a remote computer. Now, the steps of the operation will be discussed below.

Initially, the user terminal remains in a standby state in Steps S121 and S122 until it is connected to a target.

As the target is "viewed" and the user terminal is connected to the target, it is determined if the target is a device that can receive any key input or not (Step S123). If the answer is positive, the processing operation returns to Step S121 and the user terminal goes back to the standby state until it is connected to some other target.

If, on the other hand, the user terminal is connected to a device that can receive key inputs, e.g., a remote computer, each time the user keys in a character on the user terminal (Step S124), the input character is transferred to the target connected to the user terminal (Step S125).

Then, in Step S126, the connecting section 12 is asked if the connected target is switched or not. As described above, the connected target can be switched simply as the user shifts the object he or she is viewing.

If it is determined that the connected target is not switched (Step S127), the processing operation returns to Step S124 to repeat the key-in operation at the user terminal and the transfer of the input character.

If, on the other hand, it is determined that the connected target is switched (Step S127), it is determined if there is a target that is currently connected or not (Step S128).

If no target is connected currently, the processing operation returns to Step S121 and the user terminal is held in a standby state, waiting for the connection of the next target.

If it is determined that there is a target that is currently connected, an operation of actually switching the connection of target is carried out (Step S129) and the processing operation returns to Step S124 for transferring the key input of the user terminal to the newly connected target.

(3) Bulletin Board

When a large academic conference is held, bulletin boards will typically be set up to provide information about the current sessions and the rooms n where they are going on. If such information is electronically accessible by way of a computer network, the attendants of the conference may not have to move around to find a bulletin board. However, if the information is accessed only by way of a WWW (world wide web) page in order to see the "bulletin board set up at the entrance of the building", the access operation will be a painstaking one.

However, by applying the feature of "gaze-link" metaphor to a bulletin board, the user can see the updated information on the bulletin board simply by "viewing" it physically and subsequently retrieving a still image of the bulletin board on the user terminal to establish connection between them.

Particularly, in the case of a bulletin board showing topics that are periodically updated, it may be so arranged that the user can see the contents of particular topics sometime later simply by "viewing" the topics on the bulletin board.

It is also possible to selectively collect items of interest simply by viewing them. Then, an internet scrap book [15] of news items can be produced.

Figure 19:
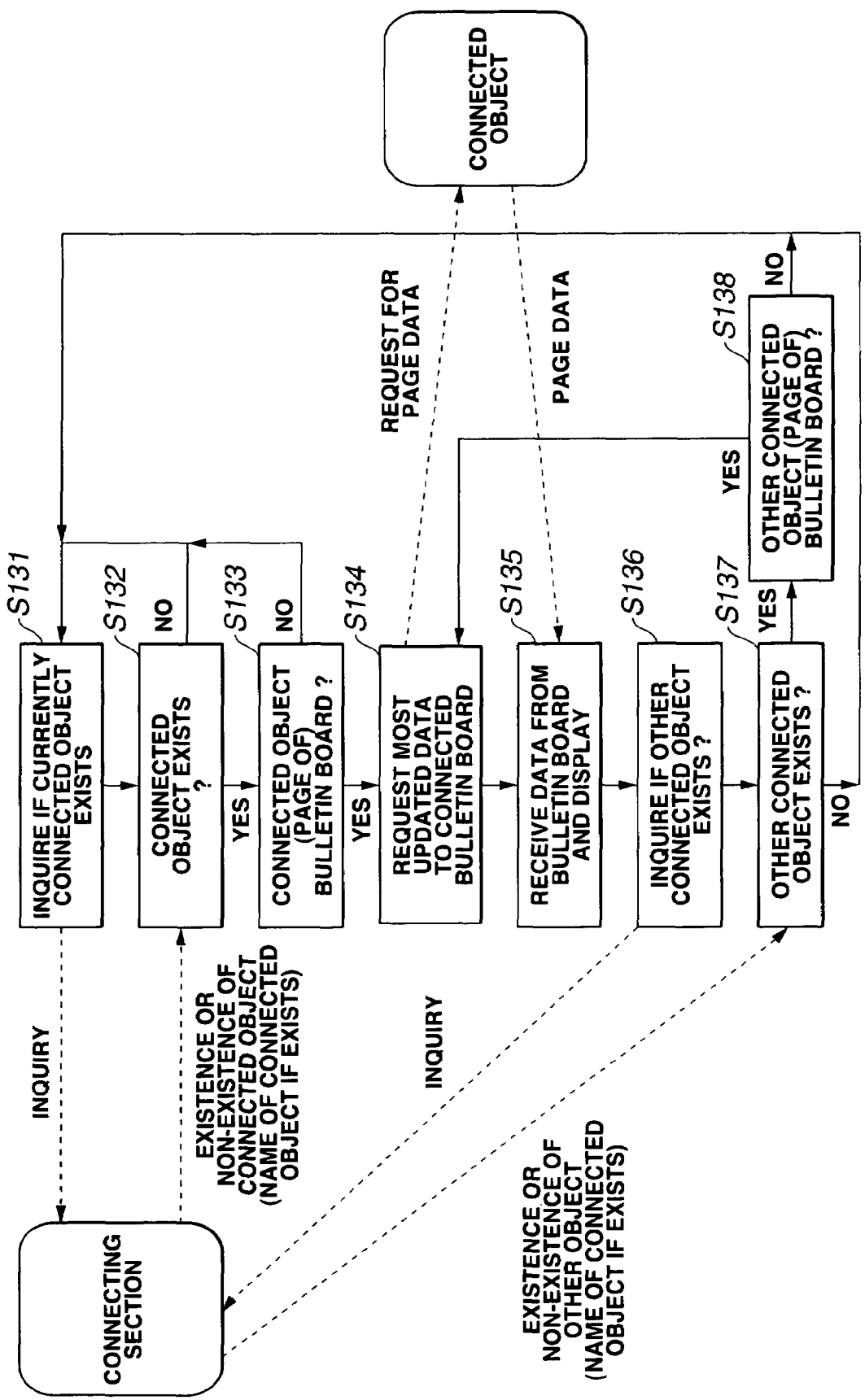
FIG. 19 is a flow chart of the processing operation of the feature of "gaze-link" metaphor as applied to Blulletinboard.

FIG. 19 is a flow chart of the processing operation of the feature of "gaze-link" metaphor as applied to Blulletin board. The steps of the operation will be discussed below.

Initially, the user terminal remains in a standby state in Steps S131 and S132 until it is connected to a target.

As the target is "viewed" and the user terminal is connected to the target, it is determined if the target is a device that contains bulletin board data or not (Step S133). If the answer is negative, the processing operation returns to Step S131 and the user terminal goes back to the standby state until it is connected to some other target.

If, on the other hand, the user terminal is connected to a bulletin board, the user terminal request the updated bulletin board data (Step S134). Upon receiving the bulletin board data from the connected target, the user terminal displays them on its own display screen (Step S135).

Then, in Step S136, the connecting section 12 is asked if there is any other target to be connected or not.

If there is no target to be connected (Step S137), the processing operation returns to Step S131 and the user terminal is held in a standby state, waiting for the connection of the next target.

If there is some other target to be connected (Step S137), it is determined if the target to be connected is a device containing bulletin board data or not (Step S138). If the target is a device containing bulletin board data, the data are obtained and displayed on the display screen. If, on the other hand, the target is not a device containing bulletin board data, the processing operation returns to Step S131 and the user terminal is held in a standby state, waiting for the connection of the next target.

(4) Other Applications of the Feature of "Gaze-Link" Metaphor

With the feature of "gaze-link" metaphor, it is possible to realize a real world-oriented interface adapted to operate with a portable computer equipped with a camera and establish connection between the user terminal and the object being viewed by the camera.

For instance, the feature of "gaze-link" metaphor may be used in an office or a residence to connect the user terminal to various information-oriented devices including electric home appliances and maintain the connection. Then, an OA (office automation) device such as a fax machine or an electric home appliance such as a refrigerator or an electric kettle can be connected to the user terminal simply by "viewing" it so that changes, if any, in the condition of the device can be monitored and the device can be operated by issuing commands to it.

An example of application of the feature of "gaze-link" metaphor to an information-related electric home appliance is Potbiff.

Figure 20:
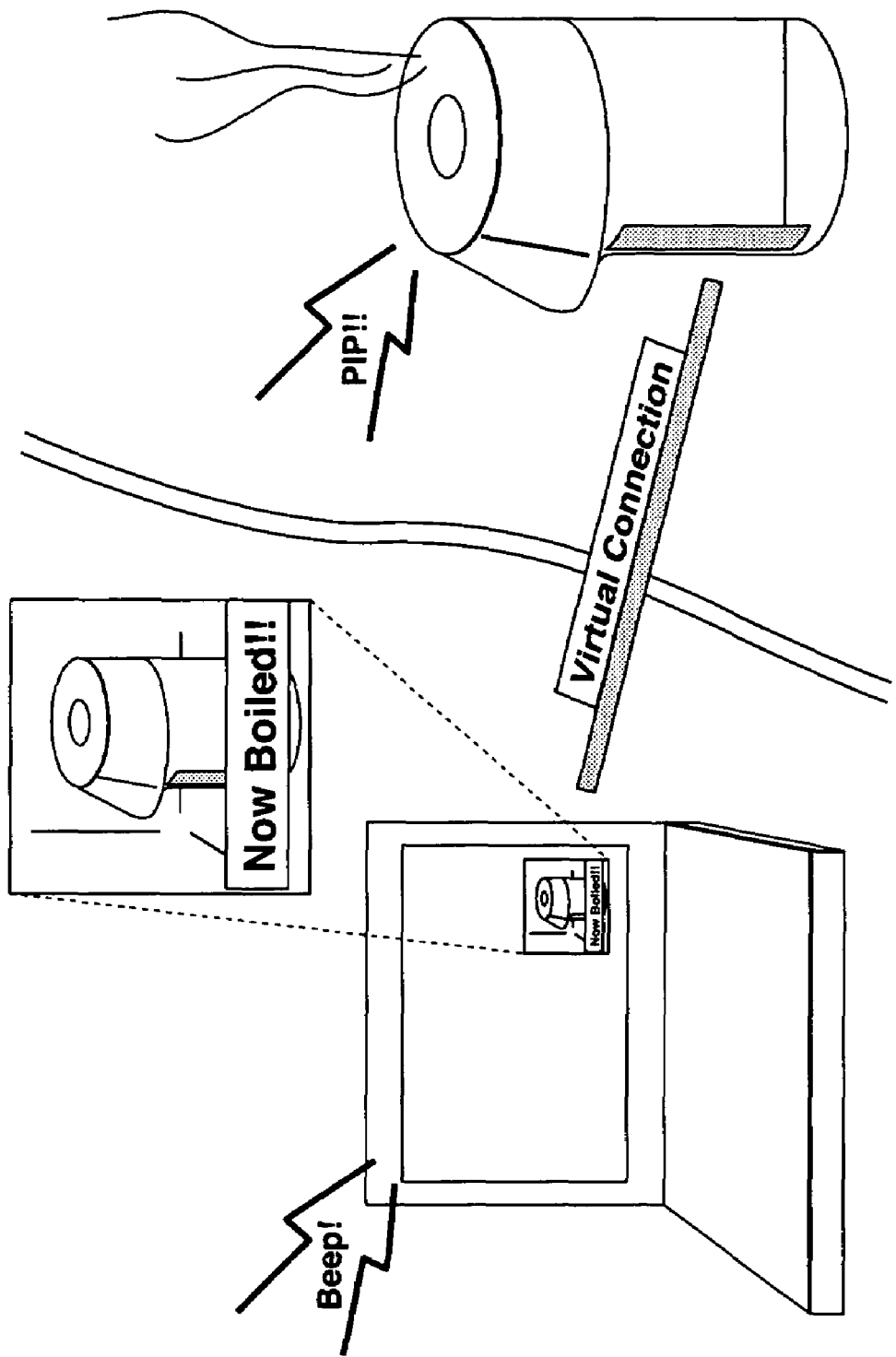
FIG. 20 is a schematic illustration of the feature of "gaze-link" metaphor as applied to an information-oriented electric home appliance, which is an electric kettle, in order to monitor and notify a state where water is boiling in the electric kettle or no hot water is left in it on the display screen of the user terminal.

FIG. 20 is a schematic illustration of the operation of the feature of "gaze-link" metaphor as applied to an information-oriented electric kettle, or "Potbiff".

Referring to FIG. 20, connection is established between the user terminal and the electric kettle as a still image of the electric kettle "viewed" by the user is displayed on the display screen of the user terminal. Additionally, their connection is sustained as long as the still image is displayed on the display screen. Under this condition, the user terminal can be notified of the fact that water is boiling in the kettle and monitor the hot water remaining in the kettle.

In an office where an electric kettle is provided for making coffee and tea, it may not be visible to everybody in the office. Then, a person who want a cup of tea may walk to the kettle only to find that water is not boiling in the kettle or the kettle is almost empty. However, with Potbiff, it is now possible to establish connection between the user terminal and the electric kettle by "viewing" the kettle so that the user may be notified of the fact that water is boiling in the kettle or remotely monitor how much hot water is left in the kettle from his or her own chair.

It may be needless to say that the feature of "gaze-link" metaphor can be introduced to not only an electric kettle but also any other information-oriented electric home appliance. For instance, the end of a washing cycle of an electric laundry machine or that of a heating operation of a microwave cooker can be remotely detected without raising the volume of the alarm. Therefore, Potbiff will be particularly useful for coin-driven laundry machines.

Figure 21:
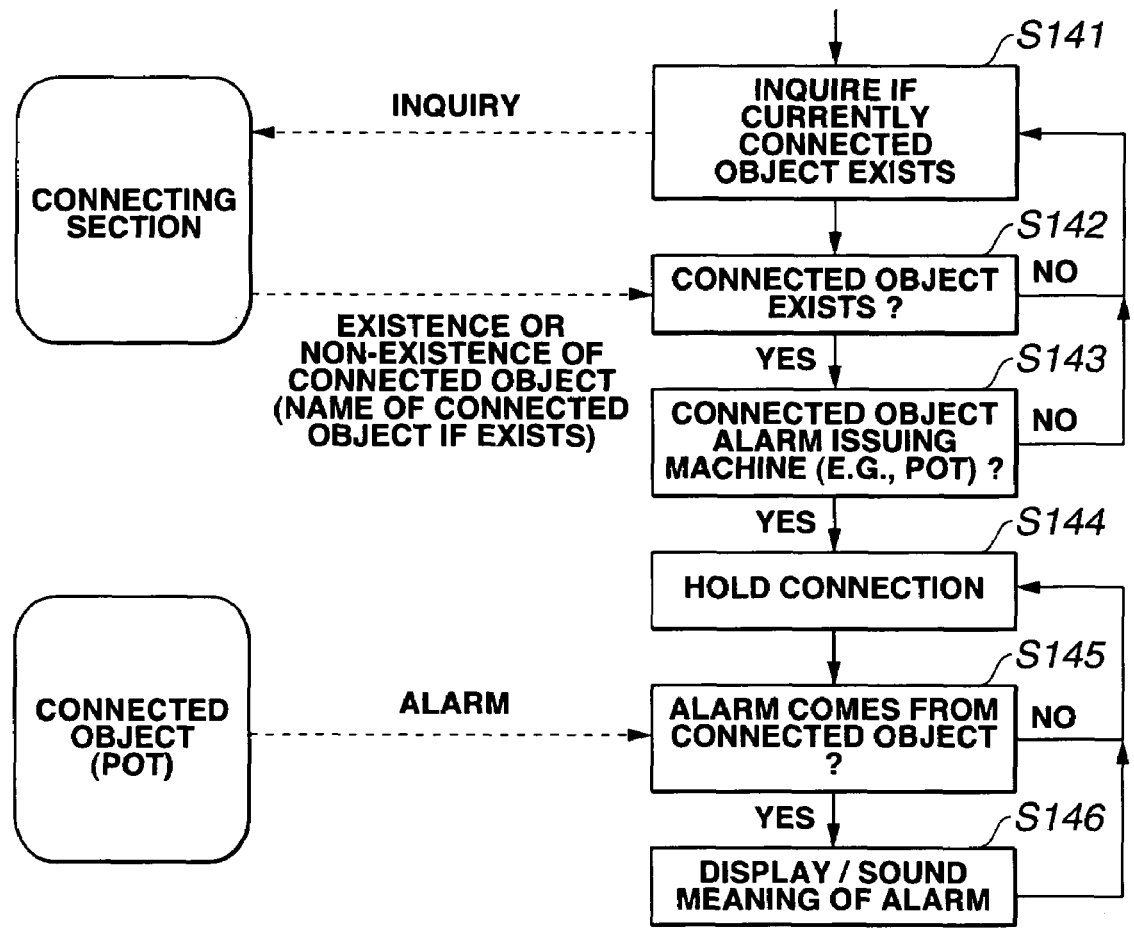
FIG. 21 is a flow chart of the processing operation of the feature of "gaze-link" metaphor as applied to an electric kettle for carrying out Potbiff.

FIG. 21 is a flow chart of the processing operation of the feature of "gaze-link" metaphor as applied to an electric kettle for carrying out Potbiff. Now the steps of the flow chart will be discussed below.

Initially, the user terminal remains in a standby state in Steps S141 and S142 until it is connected to a target.

As the target is "viewed" and the user terminal is connected to the target, it is determined if the target is a device that issues an alarm (e.g., an electric kettle that sounds an alarm when water boils in it) or not (Step S143). If the answer is negative, the processing operation returns to Step S141 and the user terminal goes back to the standby state until it is connected to some other target.

If, on the other hand, the user terminal is connected to a device that issues an alarm, the user terminal maintains the connection (Step S144) and monitors the device. Upon receiving an alarm from the connected target (Step S145), the user terminal displays the message of the alarm (e.g., "water is boiling) on its own display screen (Step S146).

Another example of application of the feature of "gaze-link" metaphor to an information-oriented electric home appliance is a video recording appointment system.

Recently, there have been marketed systems adapt to make an appointment of recording a television program by using a PC provided with a feature of television tuner and that of hard disk recording and simply by clicking the program on the table of television programs on WWW [16]. Such a system may be combined with a video recording/reproduction apparatus that can be controlled by way of a serial cable (e.g., i Link) so that it is possible to make an appointment of recording a television program by clicking the "anchor" of the television program that the user wants to see on the WWW page displayed on the display screen and "viewing" the video recording/reproduction apparatus.

Figure 22:
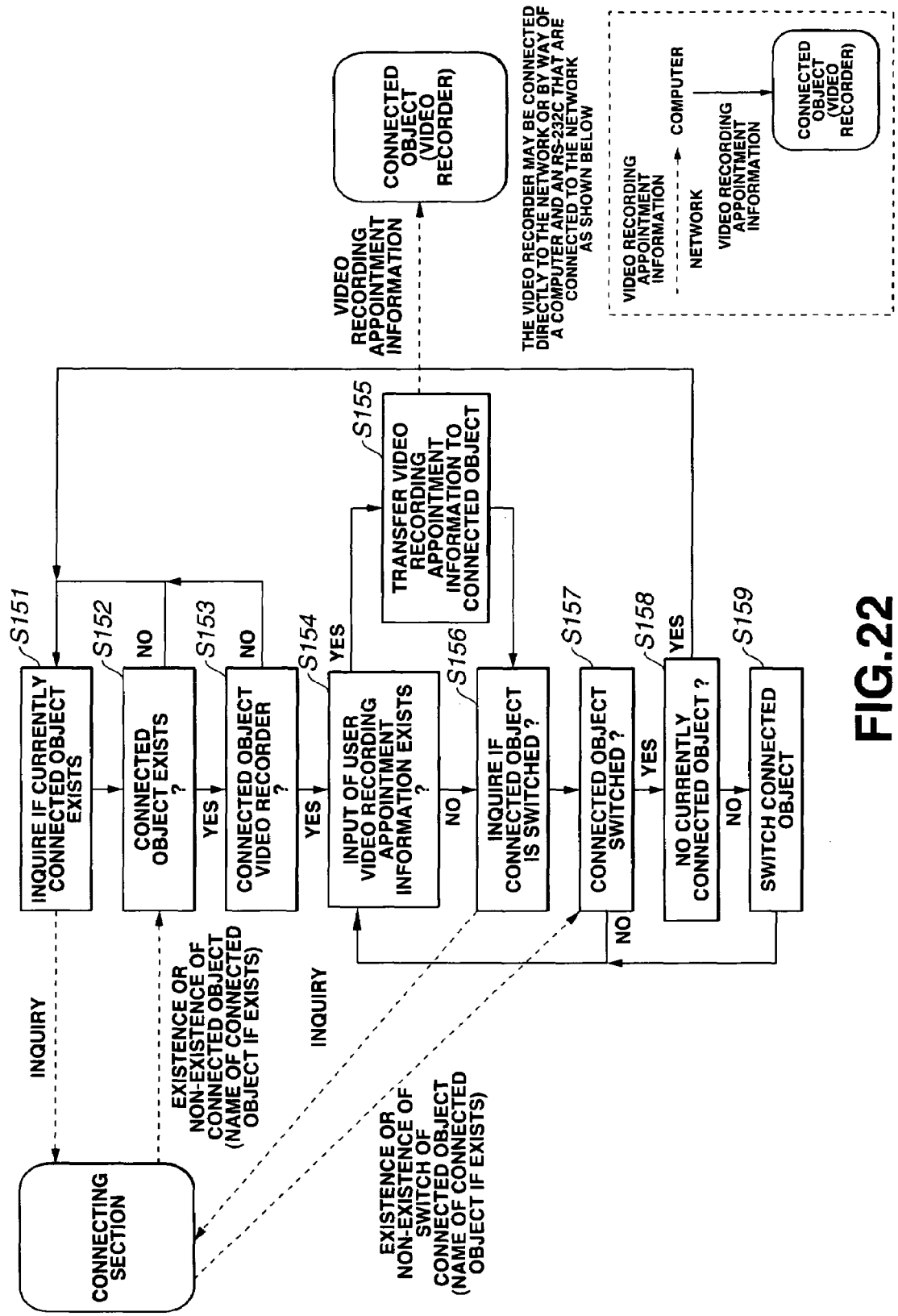
FIG. 22 is a flow chart of the processing operation of the feature of "gaze-link" metaphor as applied to a video recording appointment system.

FIG. 22 is a flow chart of the processing operation of the feature of "gaze-link" metaphor as applied to a video recording appointment system. Assume that the user terminal and the video recording/reproduction apparatus are connected by way of a network such as BlueTooth [1] or a serial cable such as RS (recommended standard)-232C or i Link so that data and commands may be transmitted therebetween. Now, the steps of the flow chart will be discussed below.

Initially, the user terminal remains in a standby state in Steps S151 and S152 until it is connected to a target.

As the target is "viewed" and the user terminal is connected to the target, it is determined if the target is a video recording/reproduction apparatus or not (Step S153). If the answer is negative, the processing operation returns to Step S151 and the user terminal goes back to the standby state until it is connected to some other target.

If, on the other hand, the user terminal is connected to a video recording/reproduction apparatus, it is determined if there is a user input relating to information on an appointment of recording a video program on the user terminal or not (Step S154). If it is determined that there is a user input, the user terminal transmits the information on the appointment to the video recording/reproduction apparatus to which it is connected (Step S155).

Then, in Step S156, the connecting section 12 is asked if the connected target is switched or not. As pointed out above, the connected device can be switched simply as the user shifts the object he or she is viewing.

If it is determined that the connected target is not switched (Step S157), the processing operation returns to Step S154 to repeat the operation of receiving a user input relating to information on an appointment of recording a video program on the user terminal and transmitting the information to the video recording/reproduction apparatus.

If, on the other hand, it is determined that the connected target is switched (Step S157), it is determined if there is a target that is currently connected or not (Step S158).

If no target is connected currently, the processing operation returns to Step S151 and the user terminal is held in a standby state, waiting for the connection of the next target.

If it is determined that there is a target that is currently connected, an operation of actually switching the connection of target is carried out (Step S159) and the processing operation returns to Step S154 to repeat the operation of receiving a user input relating to information on an appointment of recording a video program on the user terminal and transmitting the information to the video recording/reproduction apparatus.

Another example of application of the feature of "gaze-link" metaphor is "multi-purpose remote control" or "remote maintenance" by means of which what is "viewed" can be controlled.

With "multi-purpose remote control", the user terminal can be connected to any target simply by "viewing" the target and control the operation of the target. It is not necessary that the target is located in close proximity for "viewing" it in order to establish connection between the user terminal and the target. In stead, the target can be connected to the user terminal by "viewing" it remotely. Nor is it necessary to "view" the target directly. In stead, the target can be connected by retrieving a still image obtained in the past by "viewing" it in order to realize "remote maintenance".

Figure 23:
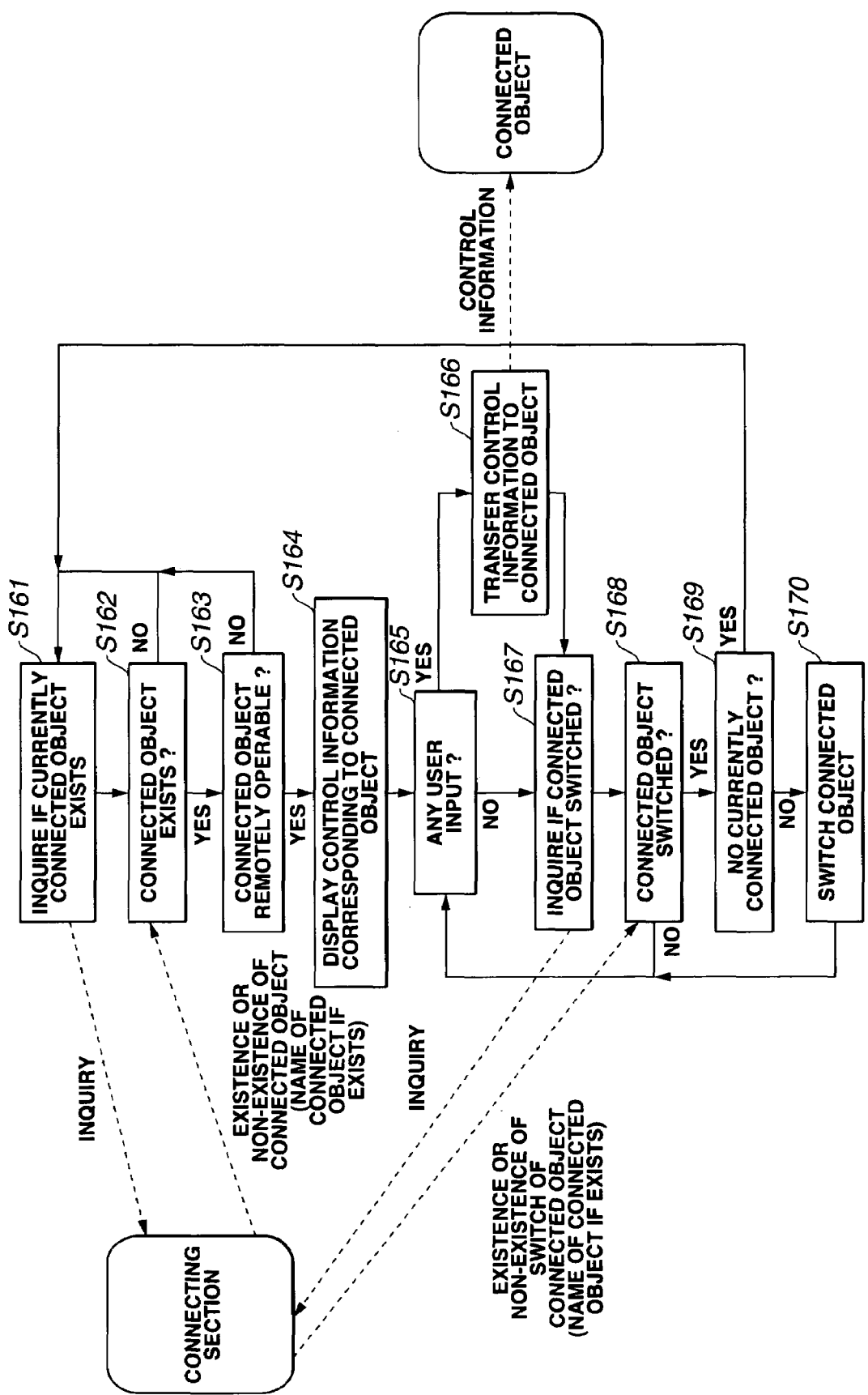
FIG. 23 is a flow chart of the processing operation of the feature of "gaze-link" metaphor as applied to a remote maintenance system.

FIG. 23 is a flow chart of the processing operation of the feature of "gaze-link" metaphor as applied to a remote maintenance system. Now, the steps of the flow chart will be discussed below.

Initially, the user terminal remains in a standby state in Steps S161 and S162 until it is connected to a target.

As the target is "viewed" and the user terminal is connected to the target, it is determined if the target is a device that can be remotely controlled or not (Step S163). If the answer is negative, the processing operation returns to Step S161 and the user terminal goes back to the standby state until it is connected to some other target.

If, on the other hand, the user terminal is connected to a remotely controllable target, an image for controlling/operating the target is displayed on the display screen of the user terminal (Step S164). If the remotely controllable target is a video recording/reproduction apparatus, a GUI image including function buttons for replay, recording, fast forward winding, fast rewinding, pause and other functions is displayed on the display screen. Alternatively, an image obtained by shooting the front control panel of the video recording/reproduction apparatus and incorporating function buttons therein in the form of icons may be used as a GUI image. With the latter arrangement, the user can remotely control the operation of the video recording/reproduction apparatus as if he or she were remotely controlling a real video recording/reproduction apparatus.

As the user operate one or more than one function keys on the display screen of the user terminal as user input (Step S165), the control information corresponding to the operated function keys is transferred to the connected target (Step S166).

Then, in Step S167, the connecting section 12 is asked if the connected target is switched or not. As pointed out above, the connected device can be switched simply as the user shifts the object he or she is viewing.

If it is determined that the connected target is not switched (Step S168), the processing operation returns to Step S165 to repeat the operation of receiving a user input of operating one or more than one function keys on the display screen of the user terminal and transferring the control information corresponding to the operated function keys to the target.

If, on the other hand, it is determined that the connected target is switched (Step S168), it is determined if there is a target that is currently connected or not (Step S169).

If no target is connected currently, the processing operation returns to Step S161 and the user terminal is held in a standby state, waiting for the connection of the next target.

If it is determined that there is a target that is currently connected, an operation of actually switching the connection of target is carried out (Step S170) and the processing operation returns to Step S165 to repeat the operation of receiving a user input of operating one or more than one function keys on the display screen of the user terminal and transferring the control information corresponding to the operated function keys to the target.

If an electric home appliance becomes malfunctioning, it is possible to transfer information relating to the malfunction by connecting the user terminal to a support center of the manufacturer or distributor simply by viewing the home appliance from behind the camera of the user terminal. It is also possible to eliminate the cause of the malfunction by modifying the specified values of some of the components, utilizing the remote maintenance function.

N. B.

Figure 24:
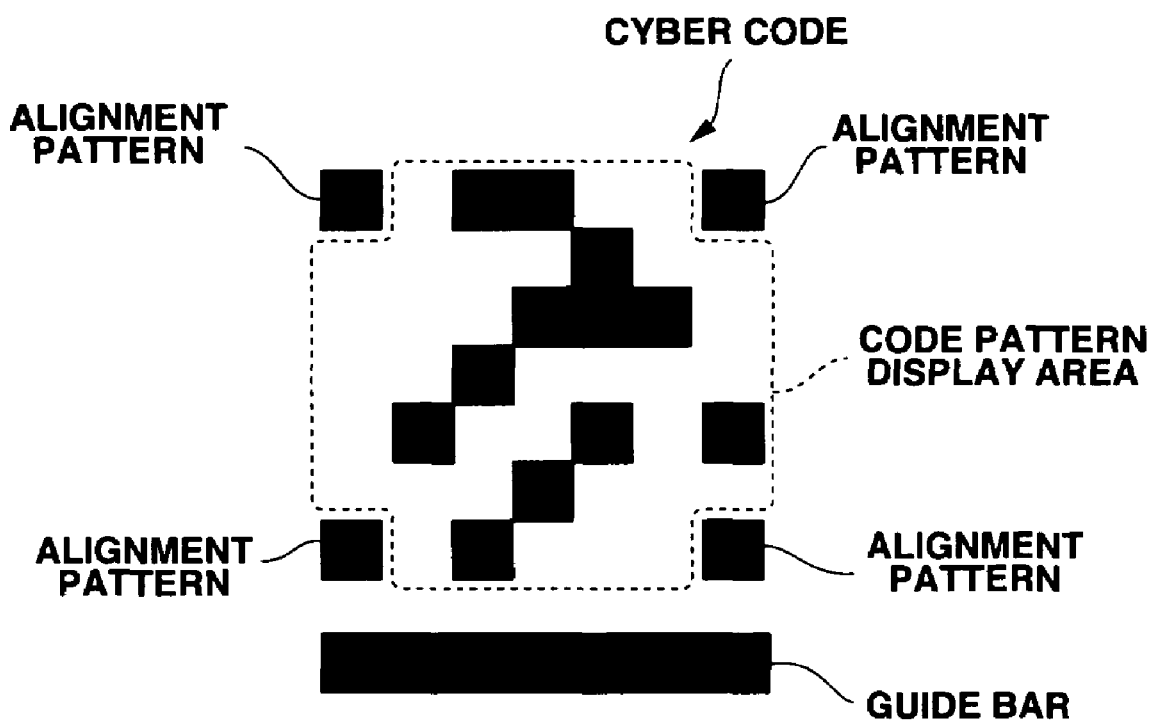
FIG. 24 is a schematic illustration of a cyber code.

Cybercode is a type of two-dimensional bar code and comprises "a guide bar region" for showing the location of the cybercode and a "code pattern region" for showing a two-dimensional code pattern as shown in FIG. 24. The code pattern region contains cells arranged to form an n×m matrix (7×7 in FIG. 24), each cell being either a white cell or a black cell to form a binary system. Note that black cells are always arranged at the four corners of the code pattern region to make them operate not as information carriers but as registration cells. Cybercode can be used to identify a total of $2^{24}$ objects by changing the arrangement of the printed cells.

The procedure of recognizing Cybercode comprises a step of binarizing the picked up image thereof, a step of finding guide bar candidates from the binarized image, a step of detecting the corner cells on the basis of the position and the direction of the guide bar and a step of decoding the bit map pattern of the image in response to the detection of the guide bar and the corner cells.

Then, the ID information and the positional information contained in the code can be recovered by carrying out an error bit check operation to make sure that the picked up image contains a correct cyber code. Any distortions that may be generated in the code as a result of inclination of the camera and/or the object can be compensated on the basis of the positions of the corner cells.

For more information on Cyber code, refer to, inter alia, Japanese Patent Application No. 10-184350 assigned to the applicant of the present patent application ("Image Processing Apparatus and Method as well as Media for Providing Images").

REFERENCES

[1]: http://www.bluetooth.com

[2]: J. Rekimoto, Pick-and-Drop: A Direct Manipulation Technique for Multiple Computer Environment. In UIST '97, pp. 31–39, October 1997.

[3]: B. Ullmaer, H. Ishii and D. Glas, Mediablocks: Physical Containers, Transports and Controls for Online Media. In SIGGRAPH '98 Proceedings, pp. 379–386. 1998.

[4]: J. Rekimoto and M. Saitoh. Augmented Surface: A Spatially Continuous Worksapce for Hybrid Computing Environments. In Processing of CHI '99 Conference on Human Factors in Computing Systems, pp. 378–385. ACM, May 1999.

[5]: G. W. Fitzmaurice, S, Zhai and M. H. Chignell. Virtual Reality for Palmtop Computers. ACM Transactions on Information Systems, Vol. 11, No. 3, pp. 197–218, July 1993.

[6]: J. Rekimoto and K. Nagao. The World through the Computer: Computer Augmented Interaction with Real World Environments. In USIT '95, pp. 29–36, November 1995.

[7]: S. Long, D. Aust. G. Abowd and C. Atkeson. Cyberguide: Prototyping Context-Aware Mobile Applications. In CHI '96 Conference Companion, pp. 293–294, 1996.

[8]: Y. Ayatsuka, J. Rekimoto and S. Matsuoka. UbiquitousLinks: Hypermedia Links Buried in the Real World Environment. Research Bulletin of the Society of Information Processing (96-HI-67), pp. 23–30, July 1996.

[9]: R. Want, K. P. Fishkin, A. Gujar and B. L. Harrison. Bridging Physical and Virtual World with Electronic Tags. In Proceedings of CHI '99 Conference on Human Factors in Computing Systems, pp. 370–377. ACM, May 1999.

[10]: N. Kanbu, J. Rekimoto, Y and Anzai. Infospuit for Supporting Moves of Information in the Real World. Interactive System and Software V (WISS '97), pp. 49–56. Japan Software Science Society, Kindai Kagakusha, December 1997.

[11]: Y. Sakane, Y. Yanagisawa, M. Tsukamoto and S. Nishio. An Expanded Disk Top Environment, Utilizing a Camera. In SPA '98 (URL: http://www.brl.ntt.co.jp/ooc/spa98/proceedings/index.html).

[12]: J. Rekimoto, Y Ayatsuka and K. Hayashi. Augmentable Reality: Situated Communication through Digital and Physical Spaces. In ISWC '98, October 1998.

[13]: J. Rekimoto. A Proposal of an Augmented Reality System Considering Simpleness and Scalability. Interactive System and Software III (WISS '95), pp. 49–56. Japan Software Science Society, Kindai Kagakusha, November 1995.

[14]: R. Want, A. Hopper. V. Falcao and J. Gibbons. The Active Badge Location System. ACM Transactions on Information Systems. Vol. 10, No. 1, pp. 91–102, January 1992.

[15]: A. Sugiura and Y. Koseki. Internet Scrapbook: Automating Web Browsing Tasks by Demonstration. In USIT '98, pp. 9–18, November 1998.

[16]: http://www.vaio.sony.co.jp/Style/Guide/Gipapocket/index.html

[Supplement]

The present invention is described in detail by way of specific embodiments. However, it is obvious that those who are skilled in the art can modify or alter the embodiments without departing from the scope of the invention. Therefore, the above described embodiments are simply non-limitative examples and the scope of the present invention is limited only by the claims that follow.

What is claimed is:

1. A portable information processing terminal adapted to be connected to one or more than one targets by way of a network, said terminal comprising:
    an imaging means for imaging visible identification information added to the targets;
    an identification means for automatically identifying the targets on the basis of the identification information imaged by said imaging means;
    a connection means for automatically identifying a connection path and establishing connection between itself and the targets identified by said identification means based on the imaged identification information; and
    an image display means for displaying the images of the targets; and
    said image display means displays status of connection to the one or more than one targets.

2. An information input/output system comprising:
    a user terminal to be used by a user;
    one or more than one targets connected to said user terminal in a format adapted to transfer of information and including visible identification information;
    an identification means for automatically identifying the targets on the basis of the identification information imaged, the identification information being added to the targets; and
    a connection means automatically identifying a connection path and for establishing connection between the user terminal and the targets identified by said identification means based on said identification information;
    said user terminal includes a display screen; and
    the images and status of connection to the one or more than one targets taken by said imaging means is displayed on said display screen.

3. The information input/output system according to claim 2, wherein
    said user terminal is connected to said targets by way of a network;
    said targets have respective network addresses;
    said information input/output system further comprising a data base means for controlling the correspondence between the identification information of each target and its network address; and
    said connection means being adapted to connect the user terminal and the targets by referring to said data base means for the network address of each target corresponding to the identification information.

4. The information input/output system according to claim 2, wherein
said connection means sustains the connection between the targets and said user terminal as long as the imaging means is imaging the targets or their identification information.

5. The information input/output system according to claim 2, wherein
said connection means sustains the connection between the targets and said user terminal as long as the targets identified by said identification means are displayed on said display screen.

6. The information input/output system according to claim 2, wherein
said images of the targets taken by said imaging means is held on said display screen as long as said connection means sustains the connection between the targets and said user terminal.

7. The information input/output system according to claim 2, wherein
said user terminal has a storage means for storing the taken images of said targets identified by said identification means; and
said connection means establishes connection between said user terminal and relevant taken targets in response to the display of said image on said display screen.

8. The information input/output system according to claim 2, wherein
said user terminal has a user input means; and
an application means transfers the user input data input by using said user input means as user input data on a computer system, or a target, as long as said connection means sustains the connection between the computer system and the user terminal.

9. The information input/output system according to claim 2, further comprising:
an application means obtains the data to be shown from targets and display them on the display screen as long as said connection means sustains the connection between said targets including said data to be shown and updated regularly or irregularly and the user terminal.

10. The information input/output system according to claim 2, further comprising:
an application means receives alarms from a target, or a device having a alarm feature and execute said alarm on said user terminal as long as said connection means sustains the connection between the target and the user terminal.

11. The information input/output system according to claim 2, further comprising:
an application means transmits the video recording appointment information input at said user terminal to a target, or a video recording/reproduction apparatus having a video recording appointment feature so long as said connection means sustains the connection between said video recording/reproduction apparatus and the user terminal.

12. The information input/output system according to claim 2, further comprising:
an application means displays an image of operation for controlling remotely controllable targets on the display screen and transmit the user operation displayed on the display screen to the targets as long as said connection means sustain the connection between the target and the user terminal.

13. An information input/output method for processing user inputs/outputs in an information space comprising a user terminal to be used by a user and having a display screen;
one or more than one targets connected to said user terminal in a format adapted to transfer of information and including visible identification information, an identification means for identifying the targets on the basis of the identification information imaged by said imaging means, the identification information being added to the targets, and a connection means for automatically identifying a connection path and establishing connection between the user terminal and the targets identified by said identification means based on said identification information; said method comprising:
(a) step of automatically identifying the targets on the basis of the identification information imaged by said imaging means;
(b) a step of establishing connection between the targets identified by said identification means and said user terminal; and
(c) displaying the images and status of connection to the one or more than one targets taken by said imaging means on said display screen.

14. The information input/output method according to claim 13, wherein
said user terminal and said targets are connected by a network; and
said targets have respective network addresses; whereas
said information space is provided with a data base means for controlling the correspondence between the identification information of each target and the network address; and
connection to said targets is realized by referring to said data base means for the network address of each target corresponding to the identification information in said step (b) of establishing connection.

15. The information input/output method according to claim 13, wherein the connection between the targets and said user terminal is sustained as long as the imaging means is imaging the targets or their identification information in said step (b) of establishing the connection.

16. The information input/output method according to claim 13, wherein
the connection between the targets and said user terminal is sustained as long as the targets identified by said identification means are displayed on a display screen in said step (b) of establishing the connection.

17. The information input/output method according to claim 13, wherein
said images of the targets are be held on a display screen as long as said connection means sustains the connection between the targets and said user terminal.

18. The information input/output method according to claim 13, wherein
said user terminal has a storage means for storing the taken images of said targets identified by said identification means; and
said step (b) is executed to establish connection established between said user terminal and relevant taken targets in response to the display of said image on said display screen.

19. The information input/output method according to claim 13, wherein
said user terminal has a storage means for storing the taken images of said targets identified by said identification means; and
said step (b) is executed to establish connection between said user terminal and relevant taken targets in response to the selection of said image from said displayed images.

20. The information input/output method according to claim 13, wherein
said user terminal has a user input means; and
the user input data input by using said user input means can be transferred as user input data on a computer system, or a target, as long as the connection between the computer system and the user terminal is sustained in said application step (d).

21. The information input/output method according to claim 13, wherein
data to be shown can be obtained from the target and displayed on the display screen as long as the connection between said targets including said data to be shown and updated regularly or irregularly and the user terminal is sustained in application step (d).

22. The information input/output method according to claim 13, wherein the alarms are received from a target and executed on said user terminal as long as the connection between a device having an alarm feature, or a target, and the user terminal is sustained in said application step (d).

23. The information input/output method according to claim 13, wherein the video recording appointment information input at said user terminal to a video recording/reproduction apparatus having a video recording appointment feature, or a target, is transmitted to the target so long as the connection between said video recording/reproduction apparatus and the user terminal is sustained in said application step (d).

24. The information input/output method according to claim 13, wherein
an image of operation for controlling remotely controllable targets is displayed on the display screen and the user operation displayed on the display screen can be transmitted to the targets as long as said the connection between the target and the user terminal is sustained in said application step (d).

25. An information input/output system comprising:
a user terminal to be used by a user;
one or more than one targets connected to said user terminal in a format adapted to transfer of information and including visible identification information;
an identification means for automatically identifying the targets on the basis of the identification information imaged by said imaging means, the identification information being added to the targets; and
a connection means for automatically identifying a connection path and establishing connection between the user terminal and the targets identified by said identification means based on said identification information; wherein
said application means transmits the video recording appointment information input at said user terminal to a target, or a video recording/reproduction apparatus having a video recording appointment feature so long as said connection means sustains the connection between said video recording/reproduction apparatus and the user terminal.

26. An information input/output method for processing user inputs/outputs in an information space comprising a user terminal to be used by a user;
one or more than one targets connected to said user terminal in a format adapted to transfer of information and including visible identification information; an identification means for identifying the targets on the basis of the identification information imaged by said imaging means, the identification information being added to the targets and a connection means for automatically identifying a connection path and establishing connection between the user terminal and the targets identified by said identification means based on said identification information; said method comprising:
(a) step of identifying the targets on the basis of the identification information imaged by said imaging means; and
(b) a step of establishing connection between the targets identified by said identification means and said user terminal;
wherein the video recording appointment information input at said user terminal to a video recording/reproduction apparatus having a video recording appointment feature, or a target, is transmitted to the target so long as the connection between said video recording/reproduction apparatus and the user terminal is sustained in said application step (d).

* * * * *